United States Patent [19]
Alliston et al.

[11] 3,914,795
[45] Oct. 21, 1975

[54] FLUID DISTRIBUTION NETWORK AND STEAM GENERATORS AND METHOD FOR NUCLEAR POWER PLANT TRAINING SIMULATOR

[75] Inventors: William H. Alliston, Murrysville; Steven J. Johnson, McKnight Road; Boris A. Mutafelija, Allison Park, all of Pa.

[73] Assignee: Westinghouse Electric Corporation, Pittsburgh, Pa.

[22] Filed: Feb. 23, 1973

[21] Appl. No.: 335,391

[52] U.S. Cl. ........................... 444/1; 176/19; 35/13
[51] Int. Cl..... G06f 15/06; G06f 15/56; G06b 9/00
[58] Field of Search ........... 444/1; 235/184; 176/19, 176/24; 35/10, 13, 10.2

[56] References Cited
UNITED STATES PATENTS
3,061,945  1/1962  Hawkins .................................. 35/10
3,237,318  3/1966  Schager .................................. 35/10

OTHER PUBLICATIONS
Reactor Simulator Utilizing a Vacuum; Harry Reese, Jr.; RCA Technical Notes, RCA TN NO.: 493, Sept. 1961.
Dynamic Simulation of a Fast Reactor; R. G. Olson, Nucleonics, May, 1957; pp. 76–79.
An Electronic Reactor Simulator; Ross Cameron & D. A. Austio; Nuclear Power; Apr., 1957; pp. 146–151.
Pwr. Training Simulator; J. P. Franz & W. H. Alliston; Nucleonics, May, 1957; pp. 80–83.

Primary Examiner—Malcolm A. Morrison
Assistant Examiner—Edward J. Wise
Attorney, Agent, or Firm—H. W. Patterson

[57] ABSTRACT

A training simulator for the real-time dynamic operation of a nuclear power plant utilizes apparatus that includes control consoles having manual and automatic devices corresponding to simulated plant components and indicating devices for monitoring physical values in the simulated plant. A digital computer configuration is connected to the control consoles to calculate the dynamic real-time simulated operation of the plant in accordance with the simulated plant components to provide output data including data for operating the control console indicating devices. In the method and system for simulating a fluid distribution network of the power plant, such as that which includes, for example, a main steam system which distributes steam from steam generators to high pressure turbine steam reheaters, steam dump valves, and feedwater heaters, the simultaneous solution of linearized non-linear algebraic equations is used to calculate all the flows throughout the simulated system. A plurality of parallel connected steam generators that supply steam to the system are simulated individually, and include the simulation of shrink-swell characteristics.

19 Claims, 17 Drawing Figures

FIG.1

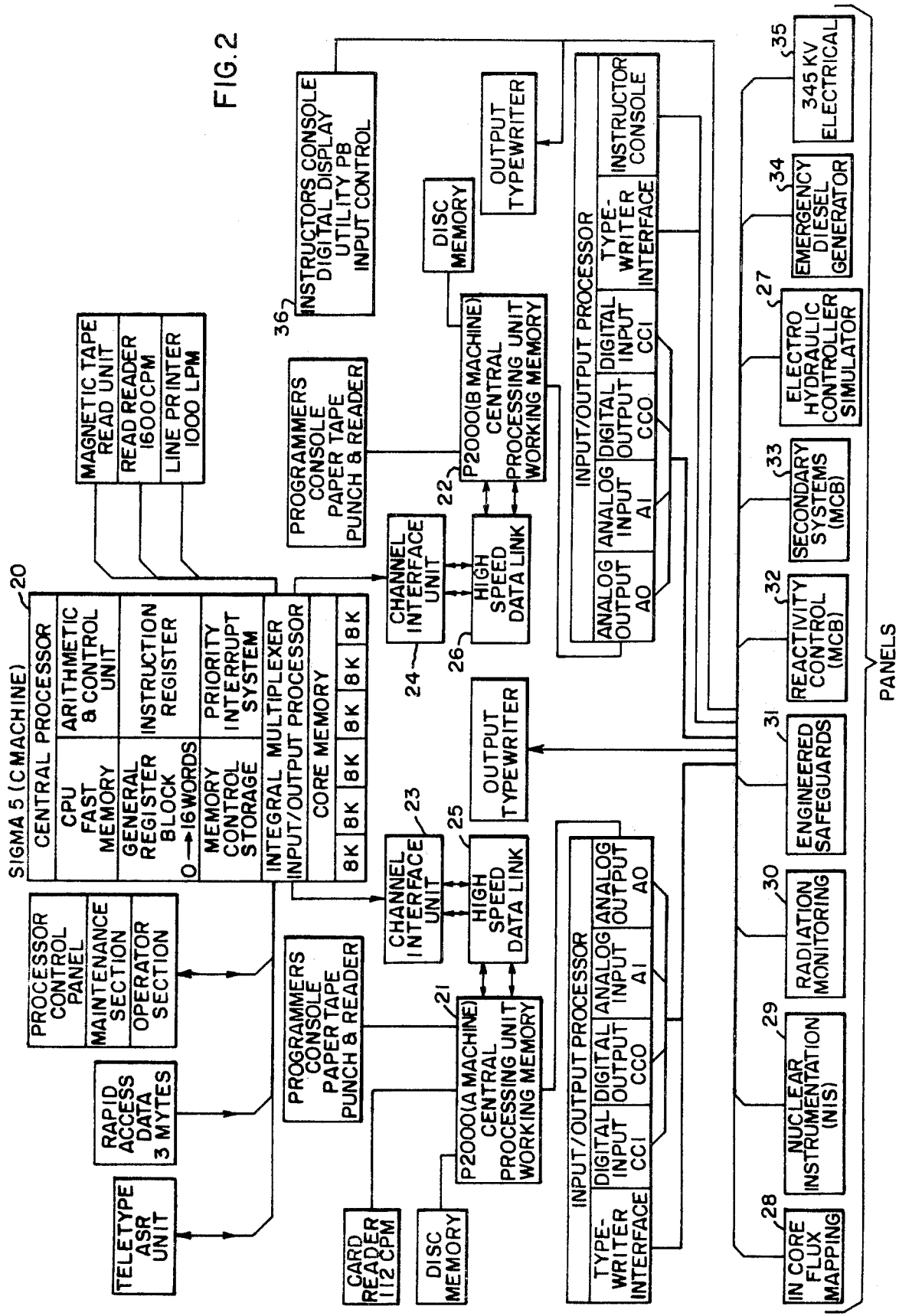

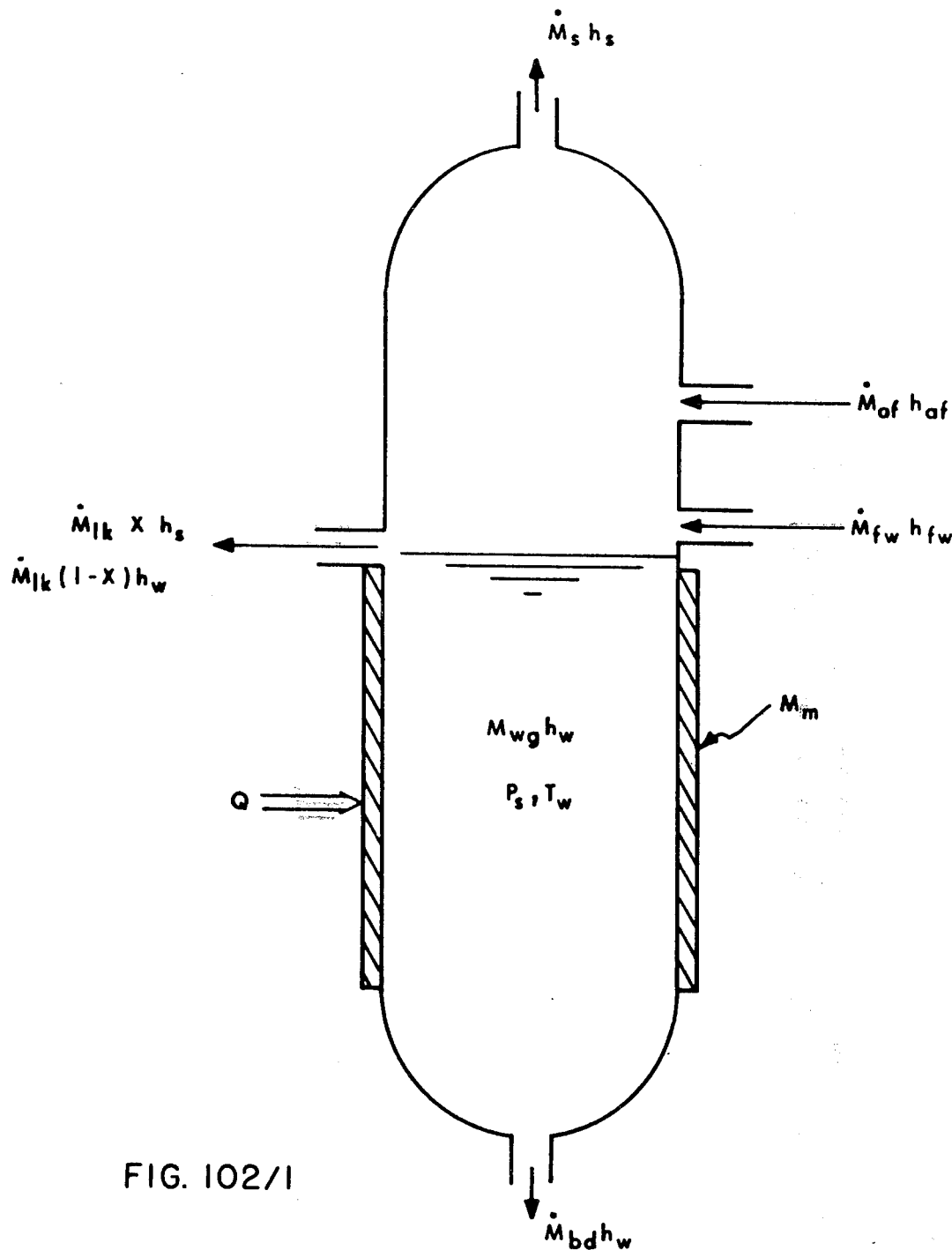
FIG. 102/1

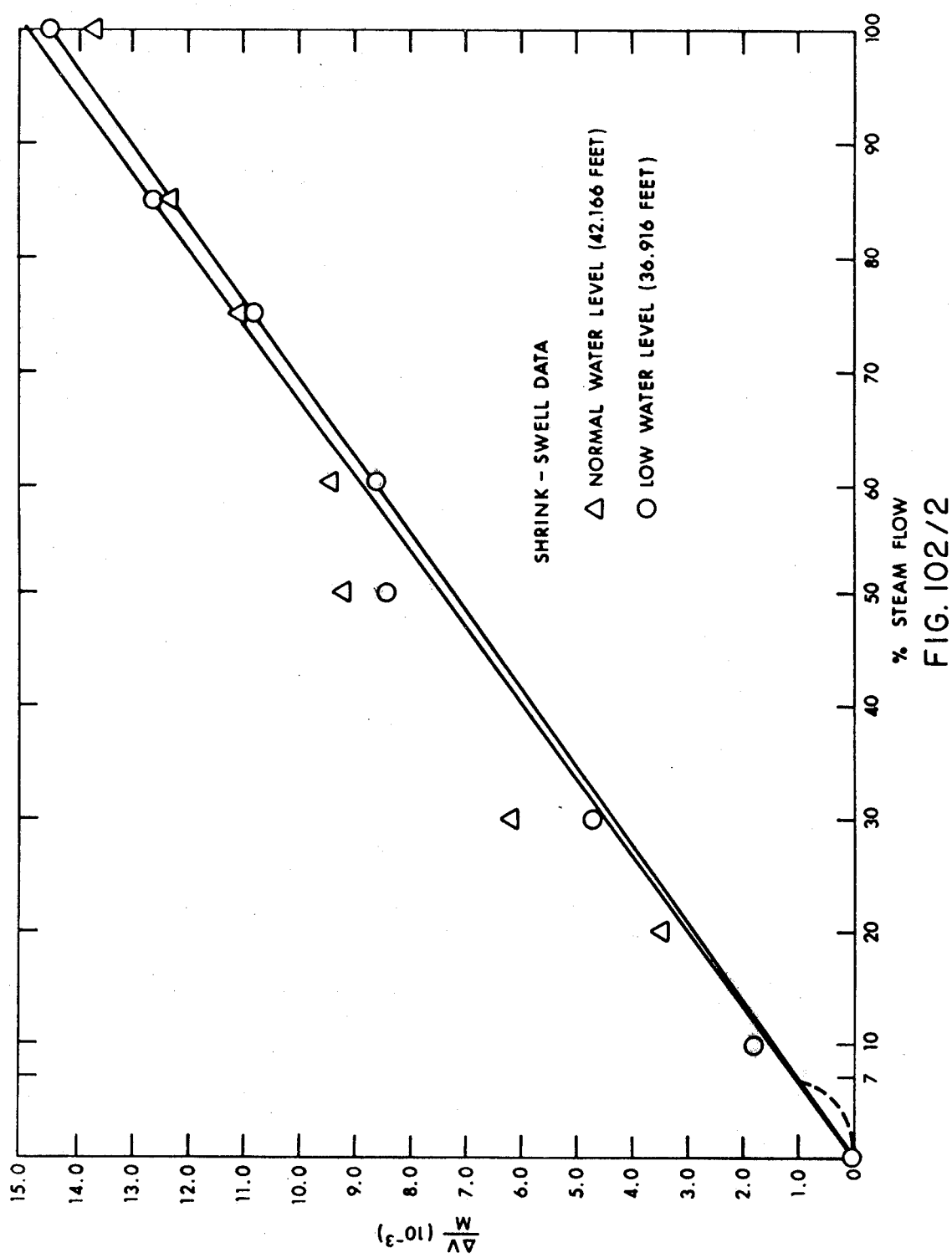
FIG. 102/2

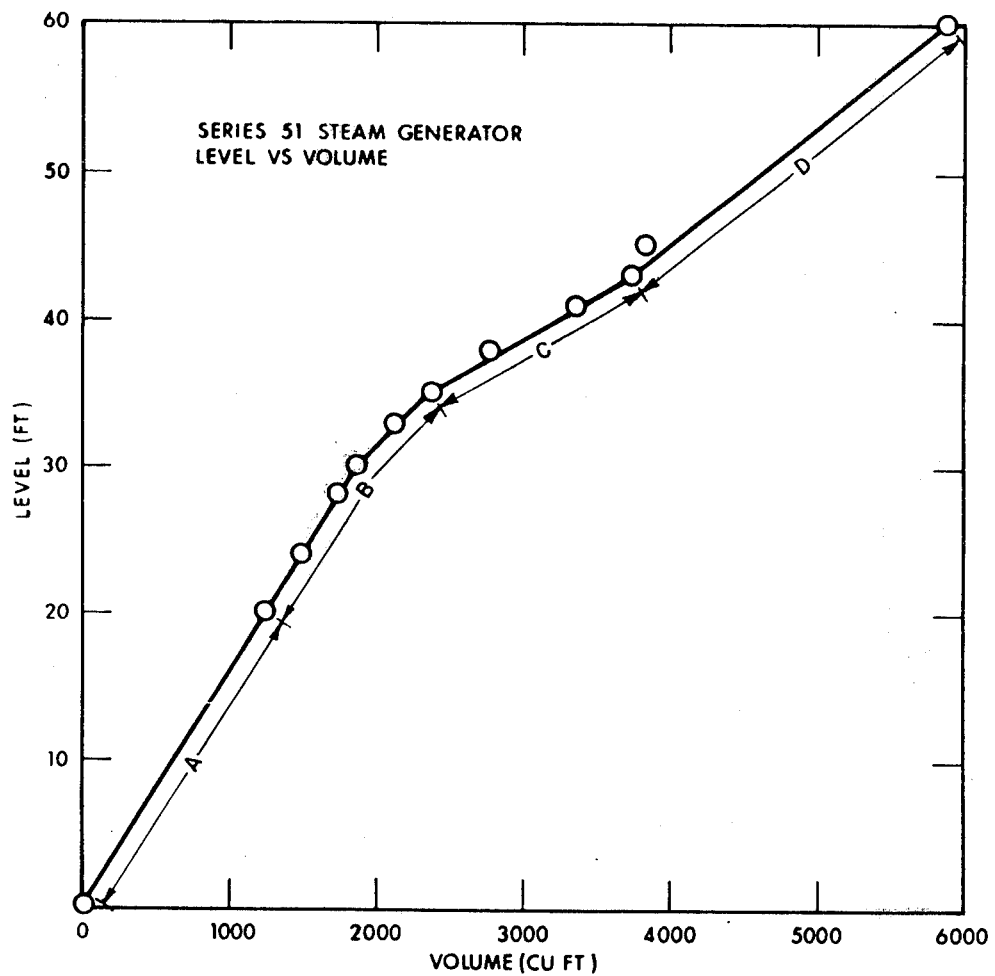
FIG. 102/3

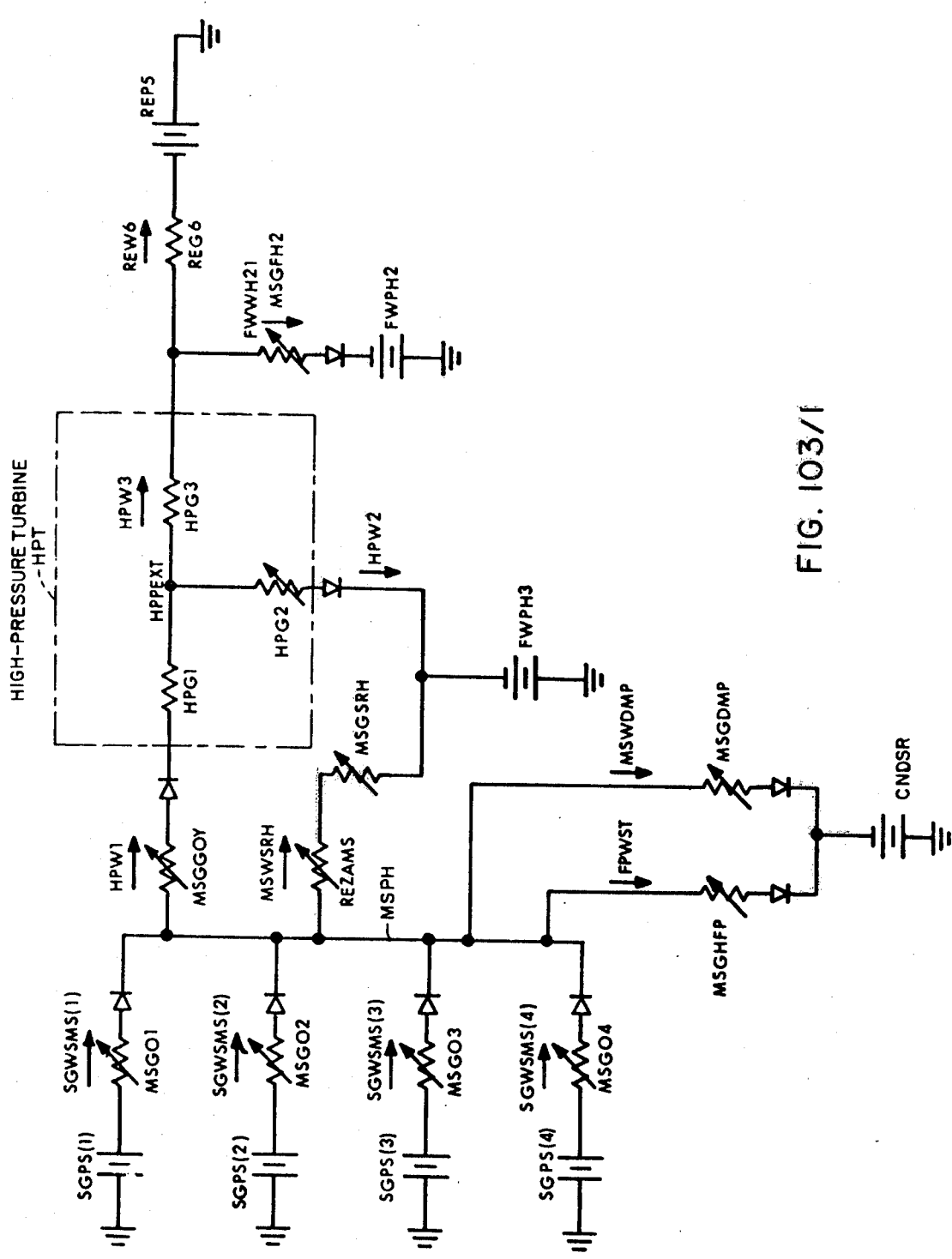
FIG. 103/1

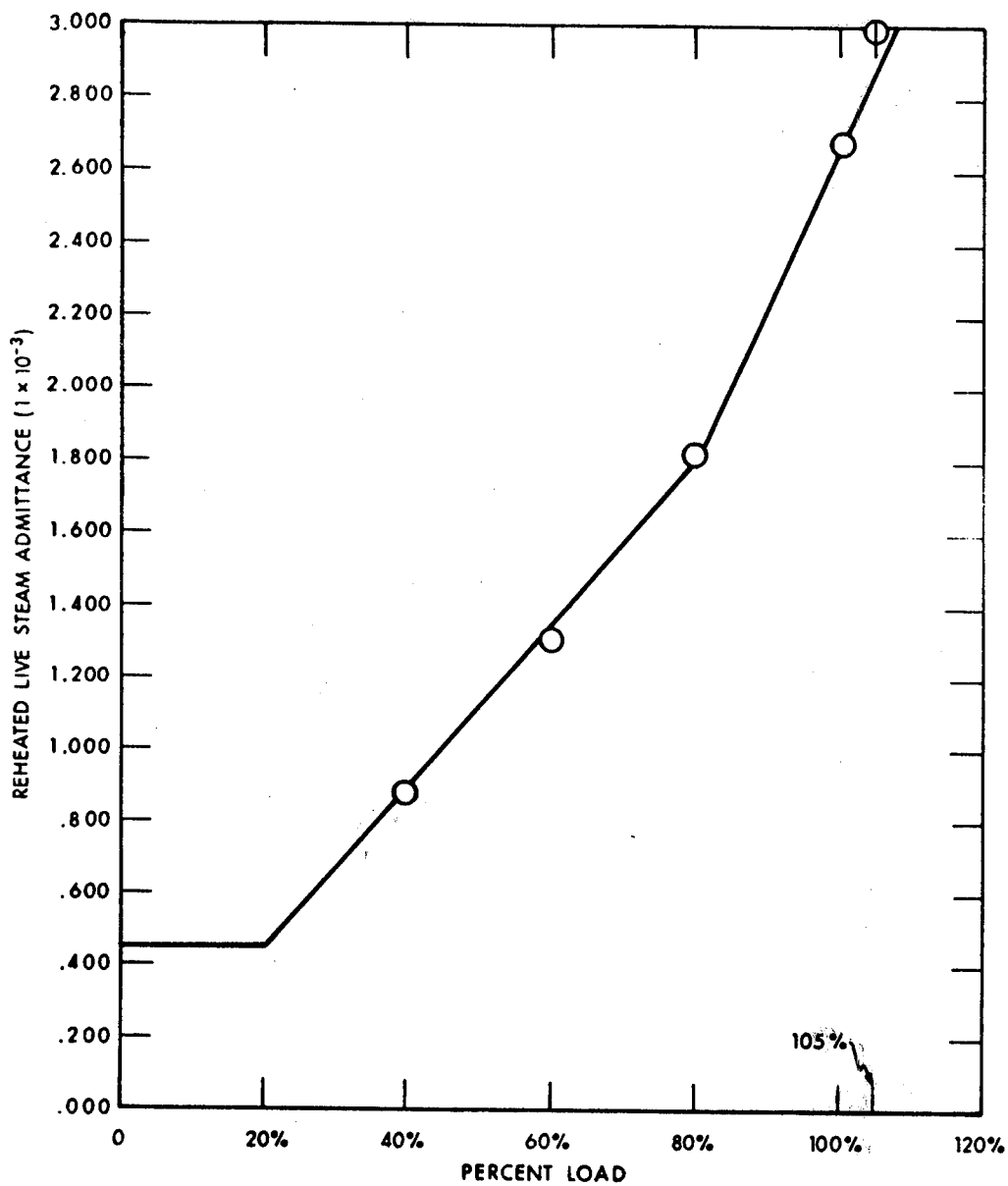
FIG. 103/2

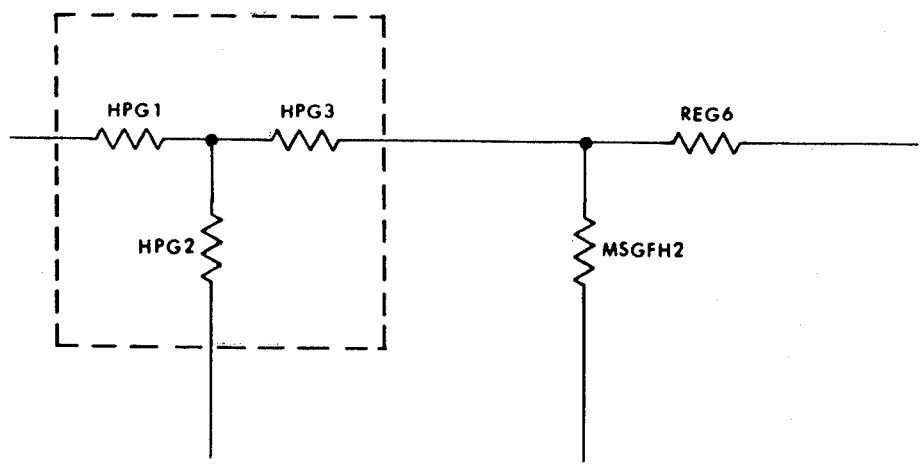
FIG. 103/3
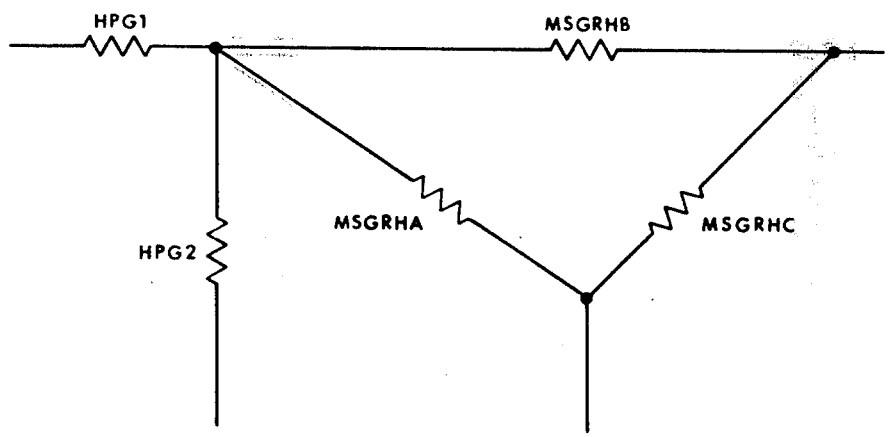
FIG. 103/4

FLUID DISTRIBUTION NETWORK AND STEAM GENERATORS AND METHOD FOR NUCLEAR POWER PLANT TRAINING SIMULATOR

CROSS REFERENCE TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola filed Feb. 23, 1973 in U.S. Patent Office.
2. Ser. No. 335,286 entitled "Nuclear Power Plant Training Simulator System And Method" and filed by R. W. Ferguson and R. E. Converse filed Feb. 23, 1973 in U.S. Patent Office.
3. Ser. No. 335,295 entitled "Nuclear Power Plant Training Simulator Modeling Organization And Method" and filed by W. H. Alliston filed Feb. 23, 1973 in U.S. Patent Office.
4. Ser. No. 335,181 entitled "Training Simulator For Nuclear Power Plant Reactor Monitoring" and filed by W. H. Alliston, F. R. Czerniejewski and B. A. Mutafelija filed Feb. 23, 1973 in U.S. Patent Office.
5. Ser. No. 335,288 entitled "Training Simulator For Nuclear Power Plant Reactor Control Model And Method" and filed by F. R. Czerniejewski filed Feb. 23, 1973 in U.S. Patent Office.
6. Ser. No. 335,294 entitled "Training Simulator For Nuclear Power Plant Reactor Coolant System And Method" and filed by W. H. Alliston and A. A. Desalu filed Feb. 23, 1973 in U.S. Patent Office.
7. Ser. No. 335,285 entitled "Engineered Safeguards Systems And Method In Nuclear Power Plant Training Simulator" and filed by A. A. Desalu filed Feb. 23, 1973 in U.S. Patent Office.
8. Ser. No. 335,183 entitled "Training Simulator And Method For Nuclear Power Plant Heater And Non-Linear Modeling" and filed by B. A. Mutafelija filed Feb. 23, 1973 in U.S. Patent Office.
9. Ser. No. 335,293 entitled "Secondary System Modeling And Method For A Nuclear Power Plant Training Simulator" and filed by S. J. Johnson filed Feb. 23, 1973 in U.S. Patent Office.

BACKGROUND OF THE INVENTION

The present invention relates to the full-scope real-time simulation of the dynamic operation of a nuclear powered electrical generating plant for training plant operators.

The increasing demand for well-trained power plant operators together with the complexity of modern day power plants, has led to the realization that the simulator is the most effective tool for such training.

Also, with advancements in nuclear power plant technology, experienced operators for time-to-time need retraining in order to be competent. An actual nuclear plant cannot provide the operator with the required experience, such as starting up, changing load, and shutting down, for example, except after years of experience; and even then, it is unlikely that he would observe the effect of important malfunctions and be able to take the best corrective procedures.

Although simulators have been used for many years, in power plant design, it is only recently that they have been used for power plant operator training. An article in the July 22, 1968 issue of "Electrical World", entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October, 1969 is an article entitled "Training Nuclear Power Plant Operators With Computerized Simulators"; and in the June, 1972 issue of the publication "Power Engineering" there is an article entitled "Simulators" which describes a number of power plant operator training simulators presently in use or proposed.

Design simulators usually cover only a small part of the process, and may run slower of faster than real-time; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation utilize a digital computer that is connected to control consoles that are identical in operation and appearance to the plant being simulated. Also, an instructor's console is connected to control the simulator, introduce simulated malfunctions, initialize the simulated plant at selected states of operation, and perform other functions useful for training purposes and control of the simulator. These computers have been of the same type used for aircraft training in some instances, and process control in another.

The simulation of a nuclear power plant for operator training is of such extensive scope that it is advantageous to provide as many modeling simplifications as possible within the limits of steady-state and transient accuracy. The mathematical modeling of a nuclear power plant is concerned with materials, energy and volume balances, which often result in mathematical variables such as temperature, pressure, materials, flows and flow rates, concentration of materials, specific volumes and enthalpies, mechanical speeds, vibrations, electrical current voltage and frequency, etc. A conference paper published by the Institute of Electrical and Electronic Engineers entitled "Mathematical Modeling for Power Plant Operator Simulators" written by W. H. Alliston et al, discusses many of the problems and desirable features connected with the mathematical modeling of power plant simulators.

Also, the simulation of the power plant for training purposes must be sufficiently complete, stable, and accurate that the operator cannot distinguish between the behavior of the simulator from that of the actual plant under conditions ranging from complete shutdown to well beyond normal operating conditions. Such accuracy and stability should include conditions of cold start-up, hot restart, and normal load changes, and also the effect of numerous malfunctions which could result in a load cut-back or a complete shutdown.

A nuclear power plant with its numerous systems and subsystems, valves, heaters, turbines, etc. is concerned throughout with flows and other physical values and states of the working fluids. The secondary system, for example, is concerned with physical states that include generating, using the energy, and finally the condensing of steam, as well as heating the condensed steam, and pumping the feedwater into the generators, all of which involve throughout the secondary system a continuous dynamic state of temperatures, pressures, flows, and volumes of the working fluid. These complicated dynamic flow networks include a main steam system that conducts steam from steam generators to reheaters, feedwater heaters, steam dump valves and the steam turbines; a condensate and feedwater system that conducts the condensed steam through feedwater heaters back to the steam generators; a circulating water system that conducts cooling water to condense the steam; an auxiliary feedwater system which is used at times to supply the steam generators with water and other minor systems.

One method and system of simulating flow in a distribution system is the piecewise approach where flow in predetermined segments of the system between components is calculated. For example, with this approach, digital simulation of flow through a section of pipe depends during each time step on a new value for upstream pressure and the preceding calcuated or old value for the downstream pressure, which requires in the main steam system simulator a smoothing technique to resolve mismatch in pressure and flow inconsistencies.

For these flow networks a system and method of simulation is desirable which permits an efficient and accurate simulation of other affected components of the plant, detailed consideration of the operation of each system component, the use of true physical equations, and efficient calculation in real-time operation. In order to obtain such advantages and simulate accurately flow distribution in such networks, it has been found desirable to use in the computer calculation a flow network solution in contrast to the piecewise approach. With the flow network solution, the digital calculation corresponds to a passive resistance electrical network which permits the simultaneous solution of flow equations for a complete system. Each passive resistance calculation can correspond to one or more physical resistances of the system which when calculated determines interrelationship of each simulated physical resistance.

Specifically, for a main steam system wherein a plurality of steam generators supply steam to the network, a flow distribution can be efficiently simulated over a complete range of operation by calculating for each steam generator individually an instantaneous energy balance equation to generate data depending on enthalpy and temperature. Then the data depending on temperature can be used to obtain data depending on pressure which can be used to calculate data depending on flow. With such an arrangement, the individual flow of each steam generator can be used in the flow network solution of the system. It is also desirable to calculate the pressure by using a spline fit function of the appropriate steam and water properties.

During each time step of the digital computer, and prior to the solution of the network equations, it is desirable to calculate data values dependent on each of the individual admittances of the system. Some of these can be obtained in accordance with data depending on flows and pressures calculated during a preceding time step. Then during each time step data depending on flows can be calculated in accordance with input data depending on pressures and admittances. With respect to the main steam system, the simulated network can be solved for flow data in accordance with the admittances, then in the simulator of the steam generator the flow data can be used to calculate pressure; and in the reheater and feedwater heaters, simulation pressure can be calculated in accordance with the main steam network flows for operating appropriate indicating devices on the control panels of the simulator.

To further provide an accurate and simple simulation of the steam generators of the main steam system, it is also desirable to simulate the shrink-swell characteristics of the water-steam volume by calculating data for steam volume in each steam generator as proportional to data depending on total steam flow of each generator multiplied by data depending on the mass of water, with each generator's total volume data being equal to the steam bubble volume data plus data depending on the volume occupied by the means of water.

SUMMARY OF THE INVENTION

In accordance with the broad principles of the present invention, a method and system for simulating the real-time dynamic operation of a power plant for training purposes utilizes apparatus wherein a plurality of control devices corresponding to control apparatus for operating the plant provide input data to a digital computer that calculates physical values during successive time steps to calculate data including data depending on fluid flow of a simulated distribution network of the system; and the calculated data operates indicating devices for monitoring plant operation. The fluid distribution system is simulated to obtain the foregoing advantages by calculations that include calculations corresonding to an analogous passive resistive electrical network for a simultaneous solution of flow equations in the network.

In a more specific aspect, the method and system as it relates to a main steam system including a plurality of steam generators for supplying steam to a common header are individually simulated by calculations that include an instantaneous energy balance equation to calculate physical values depending on enthalpy and temperature to provide the contribution of each steam generator to the flow in the system. The simulator further includes the shrink-swell characteristics of the steam generator.

BRIEF DESCRIPTION OF THE DRAWINGS

FIG. 2 shows a schematic block diagram of the apparatus used in simulating the operation of the plant shown in FIG. 1;

FIG. 95/1c is a block diagram showing the interconnection of a portion of the models used in the simulator;

FIG. 102/1 is a diagrammatic representation of the inputs and outputs for the steam generator simulation;

FIG. 102/2 is a graphical representation of the shrink-swell data for the simulation of the steam generator;

FIG. 102/3 is a graphical representation of the simulation of the stem generator with respect to its level and volume;

FIG. 103/1 illustrates an analogous electrical network for the simulation of the main steam system;

FIG. 103/2 is a graphical representation of the reheater admittance versus plant load of the main steam system;

FIG. 103/3 is an analogous electrical network utilized in the solution of the main steam network equations;

FIG. 103/4 is an analogous electrical network showing the conversion utilized in the solution of the main steam network equations.

GENERAL DESCRIPTION OF SIMULATED NUCLEAR POWER PLANT

Figure 1:
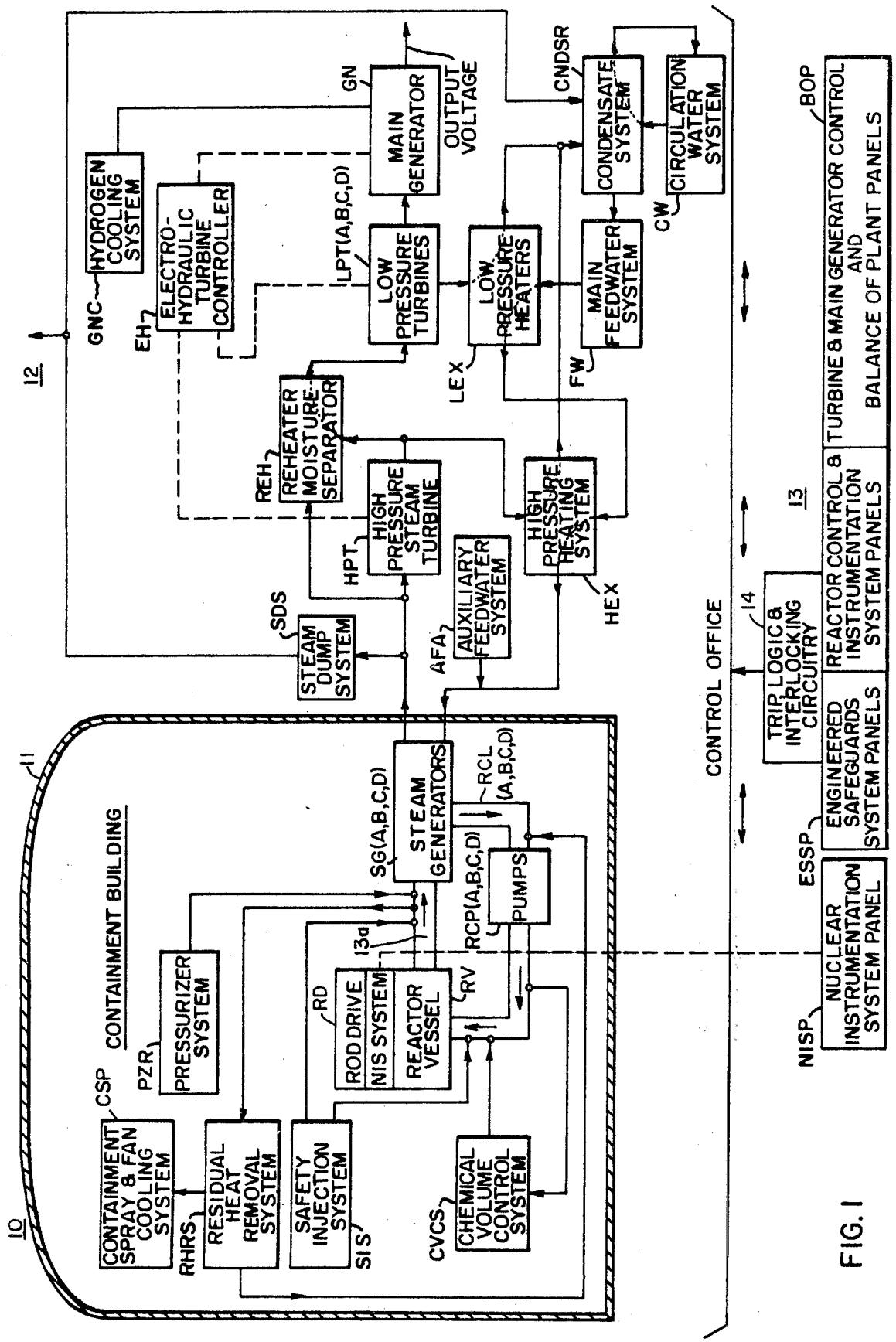
FIG. 1 shows a schematic block diagram of a nuclear powered electrical generating plant that is simulated in accordance with the present invention.
Figure 93A:
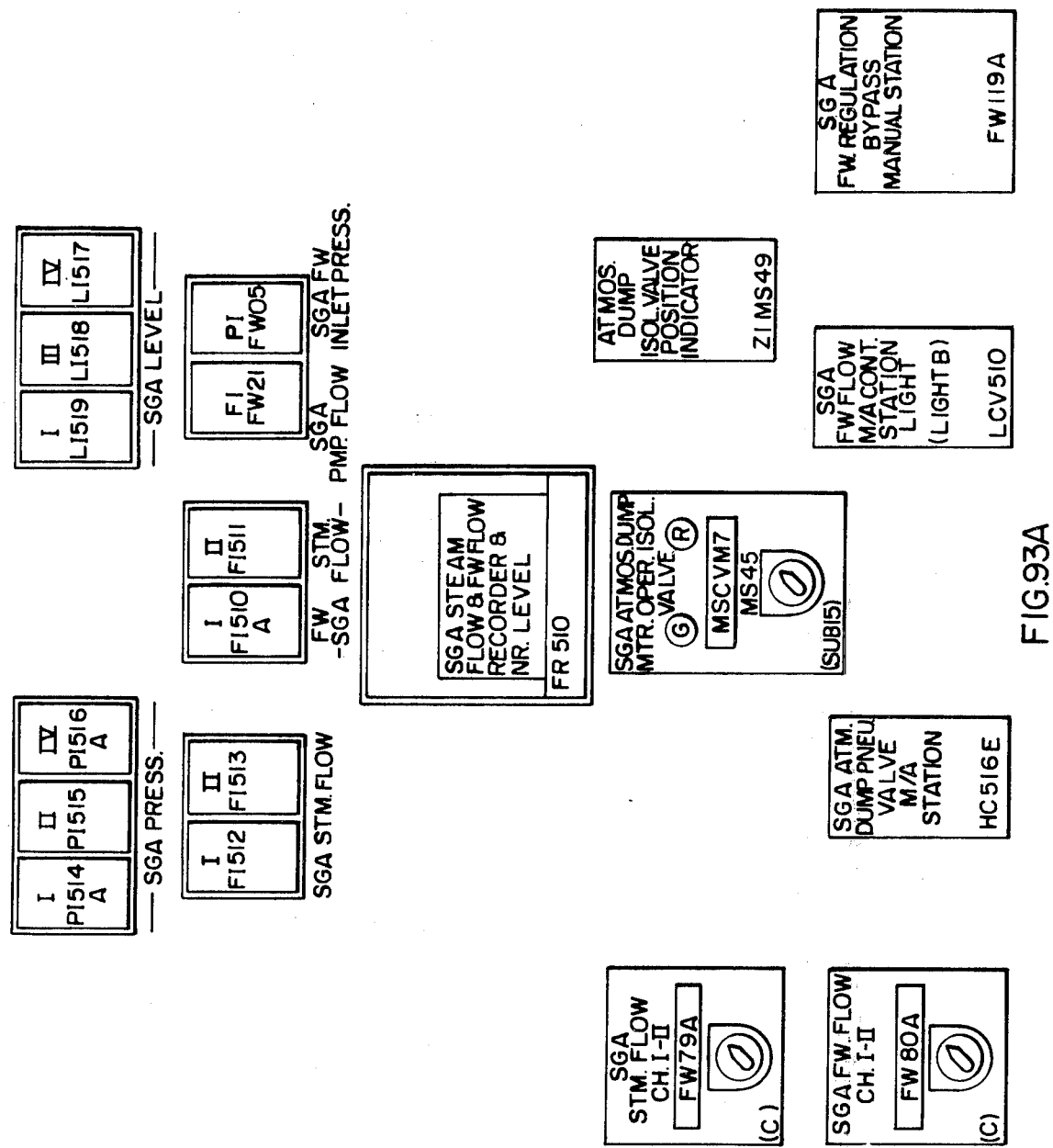
FIGS. 93A, 93C, 93F, 93H, I, and J illustrate a portion of the control panel that includes control and monitoring devices for the steam generators and main steam system.
Figure 93C:
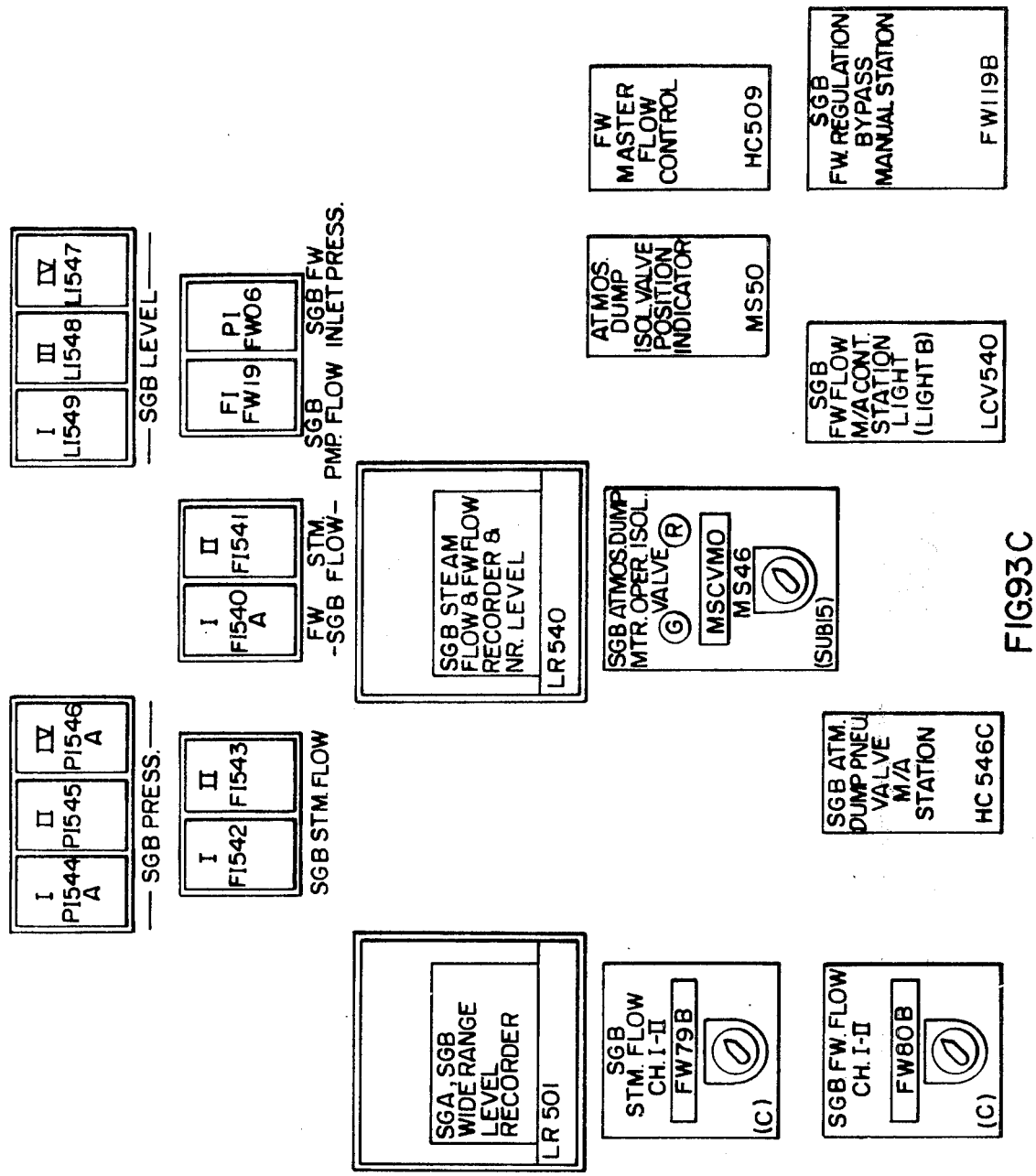
Figure 93F:
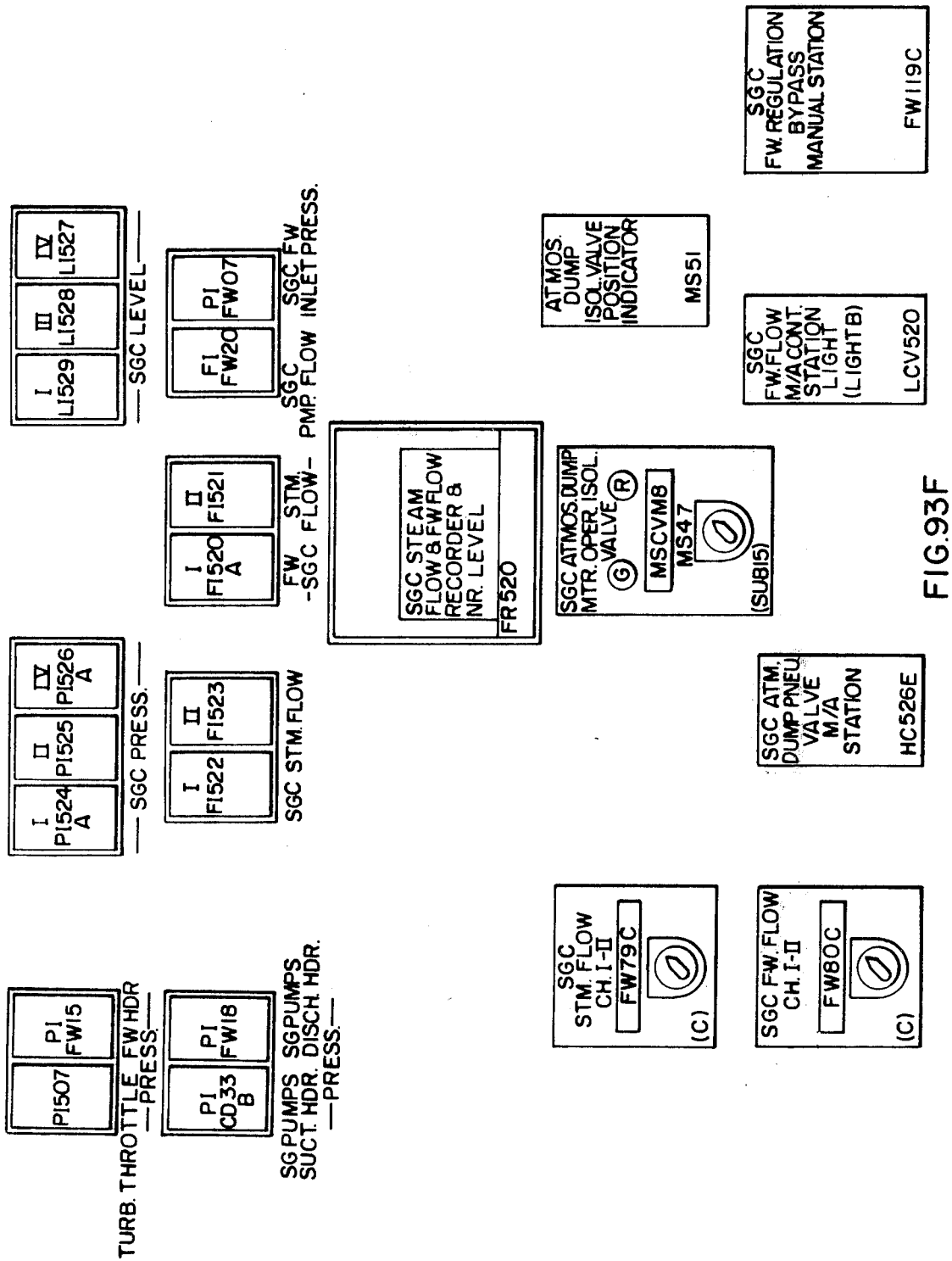
Figure 93H:
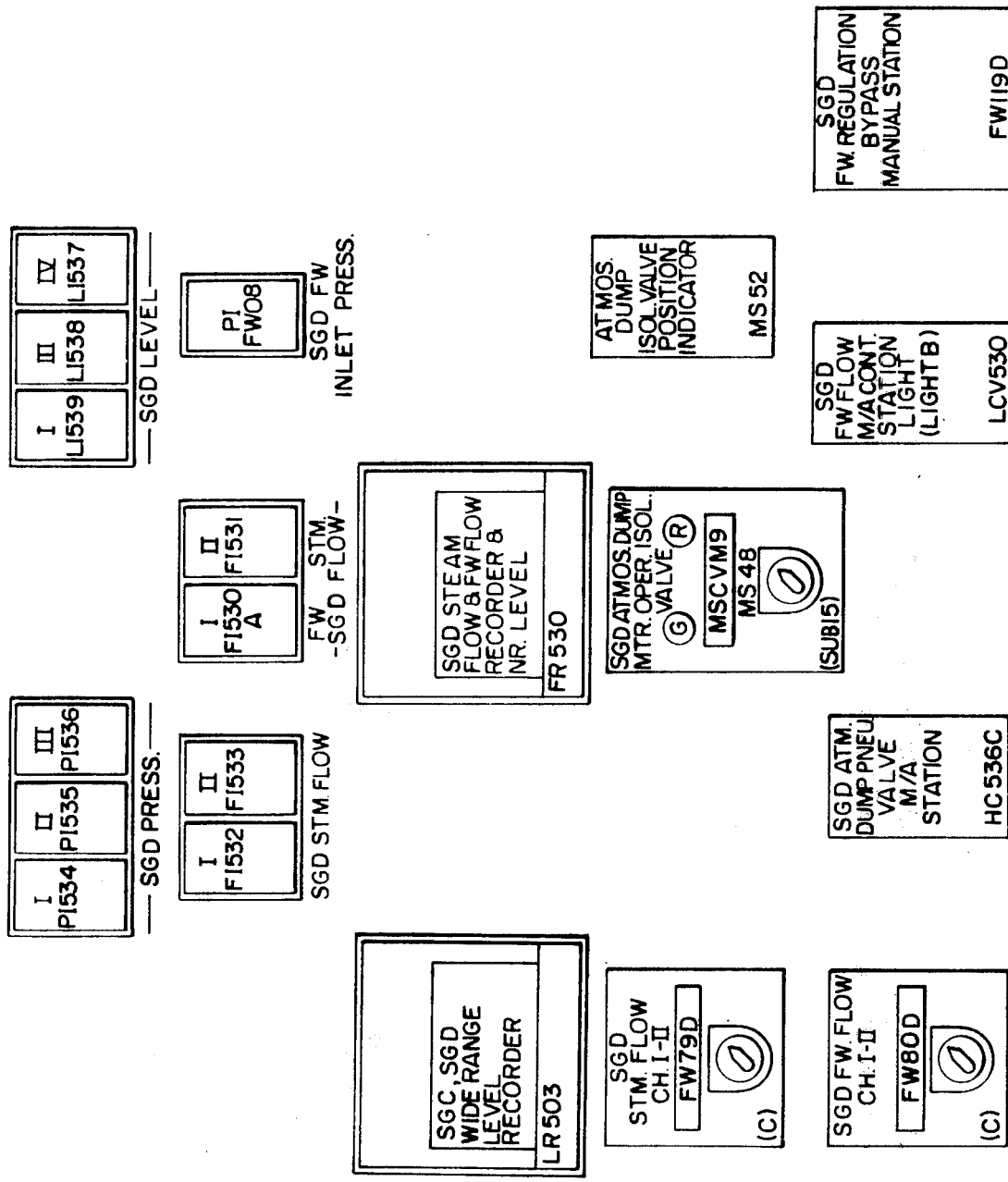
Figure 93:
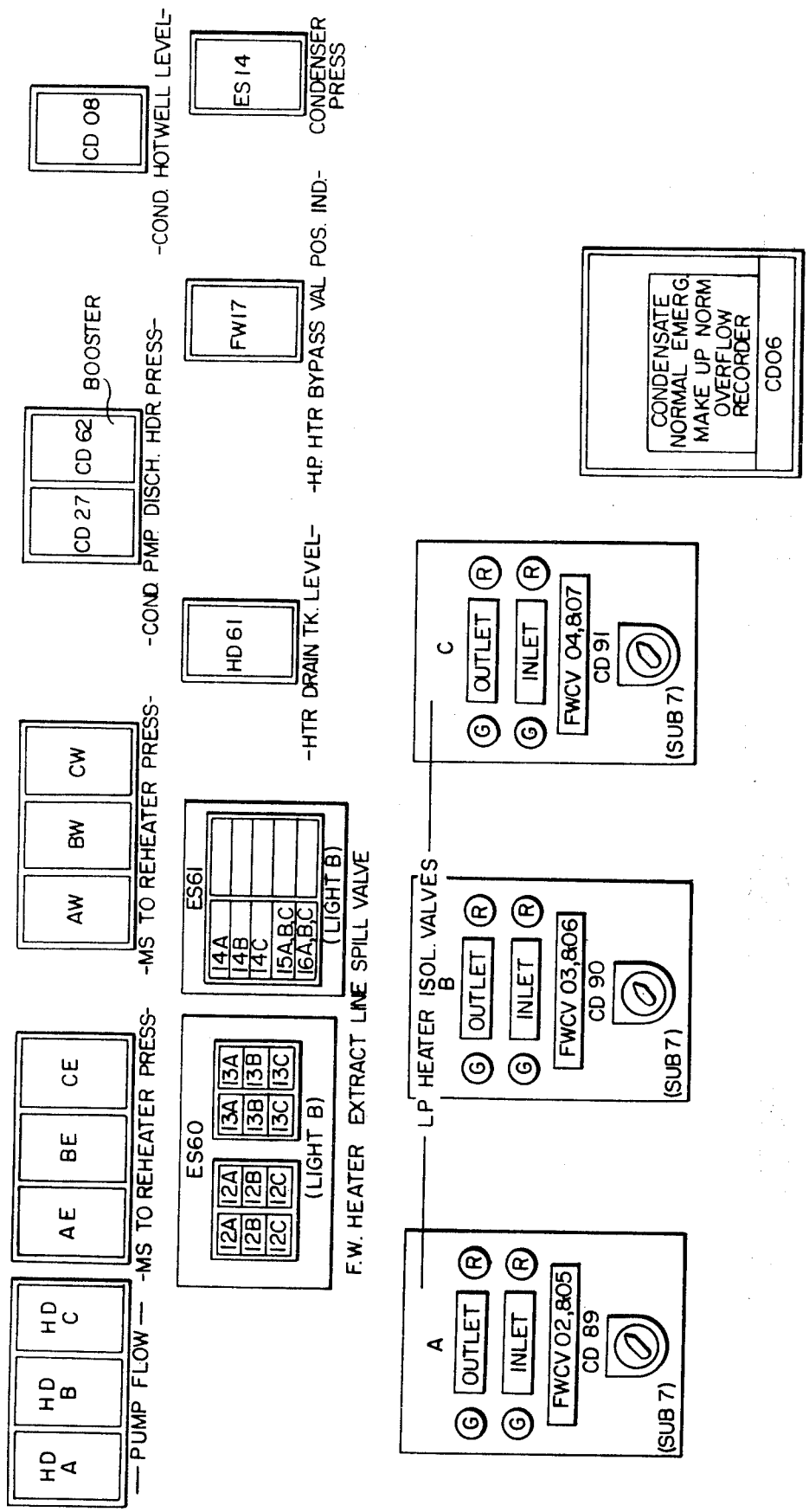
Figure 93J:
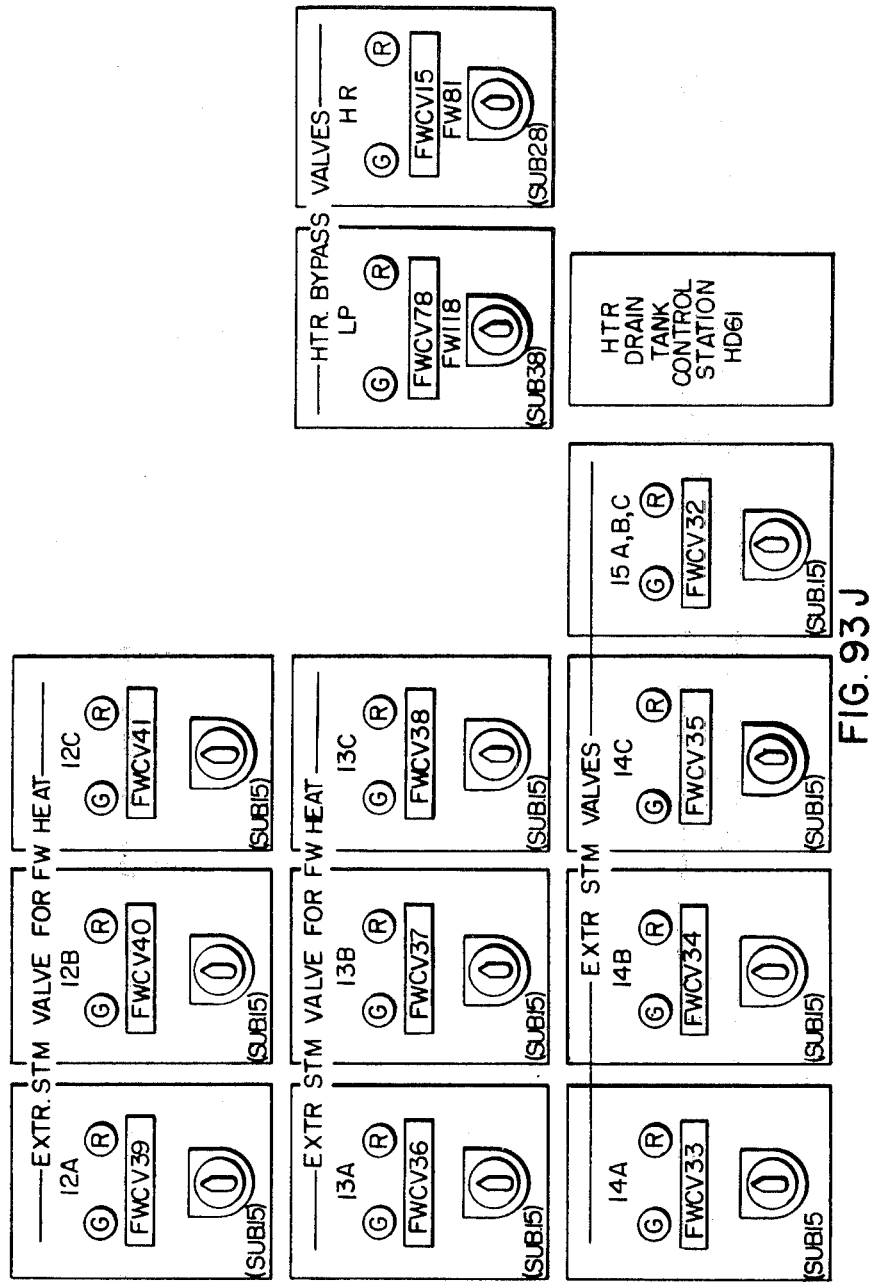

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shut-down and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means for introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressur is measured and used as a load measurement for use in reactor control.

On leaving the last row of high pressure blades, the steam has a moisture content of approximately 10%. Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10% of the flow which is extracted as moisture. The remaining 90% flows through steam heated reheater portion of REH where it receives approximately 100°F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperatures, and flows and liquid levels in the various systems, as well as the speed of the turbines and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF THE SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Specifically, and referring to FIG. 2, the simulation system includes a Sigma 5 digital computer 20 referred to at times in this specification also as the "C" machine and associated peripheral equipment. The Sigma 5 computer system is manufactured and sold by Xerox Data Systems, Inc. and has been in general use for over one year prior to the filing date of this application. For more information on the Sigma 5 computer system reference is made to the apendix.

The simulator also includes digital computers 21 and 22 referred to at times hereinafter also as the "A" machine and "B" machine, respectively and associated peripheral equipment of the type manufactured and sold by Westinghouse Electric Corporation, and which is known as model P2000, and which computers have been in general use for over one year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, b machine, and c machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program. The significant hardware features associated. with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plant protective logic are contained in both the A and B machines as hereinbefore mentioned. The control consoles permit the student operator to control and monitor the operation of the plant in the same manner as the operator of an acutal plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see relistically in real-time the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it is will aid in understanding the simulation of the system.

In the software modeling aspects of the plant simulator, various plant parts are modularly designated as individual "models". With respect to the various plant systems models, system variables are designated herein by using a maximum six character reference designation. The first two characters correspond to the system concerned; the next one or two characters correspond to the particular physical variable; and the final one or two characters correspond to a particular location, subscript, or description of the device.

The control devices located on the panels of the simulator include manually operable electrical switches for selecting and controlling the individual components included in the various models. Such switches, with few exceptions are connected by their contacts to the "A" and "B" machines; and they include analog input, bidirectional contact inputs, direct contact inputs, multiplexed contact inputs, and hardware components not directly connected to the computer. The monitoring devices on the panels include meters, counters, recorders, and lamps which are connected to the "A" or "B" machines or the hardware; and are either analog output, two wire contact output, or three wire contact output.

In the real plant the operation of the panel control devices are implemented through relay arrangements. In the simulator, control panel interface programs are utilized to simultate the relay logic. Although the control panel interface logic has a protective nature, it is separate and distnict from the plant protective logic. The programs that simulate the control panel logic are called chains which are written in the PROGEN language and are similar to FORTRAN subroutines. Each chain is a small program that performs a specific function usually on a demand basis rather than periodically. In general, the chains are organized to form self-contained subsystems such that a minimum of interconnection between chains in required.

Referring to FIG. 95/1C, te STMGEN model T24 has an output L103 which comprises turbine impulse pressure for use in the analog electrohydraulic controller model T44; and the model T44 has an output L104 which comprises the governor valve positions for input to the model T24. The model T24 has an output L105 which comprises governor valve positions, high pressure turbine inlet temperature, and high pressure turbine exit temperature for input to the turbine vibration and casing temperature (TURSUP) model t45, which model calculates rotor eccentricity, turbine vibration, vibration and eccentricity phase angle, rotor position, casing position differential expansion, rotor temperature, turbine casing temperature, and roll up and roll down residences.

The model T24 provides an output L106 which comprises a high pressure turbine exit temperature, exit pressure, exit flow, shafts power, extraction flow, and extraction temperature that is input to reheater, LP turbine, feed heater thermal (RHMSEP) model T46. The model T46 calculates the low pressure turbine steam flow and acceleration. The model T46 provides an output L107 which is the reheater inlet pressure and turbine shaft speed that is input to the model T24.

The STMGEN model T24 provides an output L108 which in line steam pressure and turbine impulse pressure that is input to the gland stream, turbine oil and generator cooling (BOPAUX) model T47, which simulates the gland steam seal system, the oil pressures in the turbine oil system, and the electrical generator hydrogen cooling system. Output L109 which comprises the gland steam pressures and turbine oil pressure is output from the model T47 to the model T24.

The model T24 has an input L110 which is the turbine feed pump steam flow that is output from the boiler feed pump characteristics (BFPEFF) model T48. The model T48 calculates the total steam flow to the feed pump turbines by considering the hydraulic horsepower requirements and the efficiency of the pump and turbine units. The model T24 has an output L111 which comprises four steam generator level error outputs and the steam dump controller error output that is input to the boiler feed pump speed and miscellaneous steam plant control (BOPCTL) model T49. The model T49 simultates the panel mounted control systems as well as several internal control systems.

The condensate and feed flow (FWFLUD) model T50 which calculates the feedwater systems pressures and flows, has an output L112 that comprises the feedwater flows through the boiler feed pump turbines to determine the turbine load that is input to the model T48. The model T50 has an input L113 from the model T24 which comprises the steam generator pressures; and an output L114 to the model T24 that comprises steam generator feed flows the feed enthalpies.

The auxiliary feed (AUXFED) model T51, which model simulates the auxiliary feedwater systems pressures and flows has an input L115 from the model T24 which comprises auxiliary feed line pressures. The model T51 has an output L116 to the STMGEN model T24 which comprises the auxalary feedwater flow and enthalpies. The valve handler has an output L117 to the model T24 which comprises all the main steam system value admittances except the governor valves.

The PHMSEP model T46 previously mentioned has an output L118 which comprises the turbine speed, low pressure turbine steam temperatures (inlet and exit); and the low pressure turbine losses which is input to the model T45. Also, the model T46 has an output L119 to the analog EH controller model T44 that comprises low pressure turbine pressures, inlet temperature, and turbine speed. The output L20 from the model T46 which comprises the reheater temperature is input to the reheater controller T52 on the control panel. The reheater controller T52 has an ouput L121 to the model T46 which comprises the reheat steam valve position.

The turbine speed output L122 from the model T46 is input to the generator exciter and regulator (EXGEMM) model T53, which model simulates the electrical generator and exciter. In turn, the model T53 has an output L123 to the model T46 which comprises the generator shaft power which is utilized for turbine acceleration calculation in the model T46. Also, the model T46 has an ouput L124 which comprises the low pressure turbine exit steam flow and enthalpy for input to the condenser (CNDSR) model T54, which model simulates the main condenser in the steam plant. In turn, the model T54 has an output L125 to the model T46 which comprises the condenser pressure and the condenser air quantity which is utilized for windage loss calculation.

The stream plant protective logic in the B machine shown as block T55 has an output L126 to the analog controller T44 which comprises the turbine trip signal and the turbine run back signal. The block T55 also has an output L127 from the B machine which comprises the turbine trip signal for the reactor trip that is input to the reactor protection logic of the A machines. In turn, the reactor protection logic in the A machine has an input through the B machine to the steam plant protective logic T55 which comprises the reactor trip signal and the turbine run back signal (L128). The input L129 to the block T55 which comprises all steam plant limit check signals for the protective logic is output from the steam plant limit checks (SECLIM) model T56, which model checks the limit of the plant process variable for the purpose of annunciation and protection.

The model T56 has an output L130 which comprises the alarm and annunicator inputs from the steam plant limit checks. This output activates the B machine output contacts. The input L131 from all steam plant program to the model T56 includes all steam plant variables for limit checking.

The generator, exciter, and regulator model T53 has an output L132 to the analog controller T44 which comprises the generator megawatt signal and trip signal. Also, the model T53 has an output L133 which comprises the generator terminal voltage that is input to the plant electrical system (ELBUS1, ELBUS2) model T57, which model calculates the logical variables denoting power status in the busses based on the position of the circuit breakers. In turn, the model T57 has an output L134 to the model T53 which comprises the generator megawatt and megavar load. The model T53 also has an output L135 which comprises the generator frequency; that is, shaft speed, for driving the synchroscope that is input to the synchroscope interface represented at block T58. The model T58 comprises logic chains in the B machine that select the correct frequency difference and drives the synchroscope hardware when it is in use. The model T53 also has an output L136 to the previously mentioned model T47 that comprises the generator heat losses for hydrogen cooling.

The inputs 137 from the valve handler to the model T51 are all the auxiliary feed system valve admittances; and the input L138 from the pump handler to the model T51 comprises the motor driven auxiliary boiler feed pump heads.

Referring to the previously mentioned condensate and feed flow moden T50, the output L139 to the model T46 comprises the feed and condensate system flows for the calculation of heat energy balances. The input L140 comprises the gland stream pressures and turbine oil pressures for the low pressure turbine to the model T46 is ouput from the model T47.

The service water (SERWTR) model T59, which simulates the service water system according to the demands on the system and the number of pumps that are running has an ouput L141 which comprises the service water flow and temperature that is input to the auxiliary feed model T51. The input L142 to the model T59 from the valve handler comprises all service water system valve admittances; and the input L143 from the pump handler comprises the service water pump head.

The service water model T59 has an output L144 to the component cooling system model T32 (see FIG. 95/1D) that comprises the service water flow to the component and temperature to the component cooling heat exchanger. Also, the output L145 from the service water model T59 which comprises the service water pump motor electrical load is input to the model T57.

The condenser model T54 has an output 146 to the model T50 which comprises condenser pressure and hot well temperature. In turn the model T50 has an ouput L147 to the model T54 which comprises constant condensate flow and hot well level control flow (feed-drain). The model FWFLUD T50 also has an input L148 which comprises the boiler feed pump speed command that is output from the model T49. This boiler feed pump speed command L148 is also input to the model T48. The model T50 also has an output L149 which comprises the hot well level control signal and the condensate pump recirculation flow control signal that is input into the model T49. The input L150 to the model T50 comprises the feed network flows which are obtained from the flow network solution (CROUT) model T60. The model T60 mechanizes the solution of the feedwater network. In turn, output L151 which comprises the feed flow network pressure drop coefficients which are determined from valve admittances is output from the model T50 to the model T60. Inputs L152 and L153, respectively to the model T50 comprises the condensate pump heads and motor driven boiler feed pump heads, and all feed and condensate system valve admittances from the pump handler and the valve handler. The feed valves are commanded directly from the controller handler to the valve handler, which connection is not shown.

Referring to the model T47 previously mentioned, the output L154 which comprises gland steam flows to determine air leakage of the glands is input to the condenser model T54. Also, T47 has an output L155 to the model T49, which ouput comprises the gland steam condenser pressure and the generator hydrogen temperature. In turn, the BOPCTL model T49 has an output L156 which comprises the gland steam condenser bypass flow control signal and the generator cooling temperature control signal that is input into the gland steam model T47. The condenser model T54 includes an output L157 that comprises the condenser heat load to the circulating water that is input to the circulating water system (CIRWTR) model T62, which model contains the pressure and flow calculations of the circulating water system. In turn, the circulating water system model T61 has an output L158 which comprises the circulating water flow and temperature to the condenser that is input to the model T54. The valve handler and pump handler inputs L159 and L160 comprises all circulating water system valve admittances and circulating water pump heads respectively.

Steam plant instrument channel simulation (BOPA02, BOPA04) model T62 calculates the redundant measurements of process variables within the other models. The subroutine BOPAO2 calculates the redundant analog outputs that are updated twice a second while BOPAO4 calculates the four per second redundant analog outputs. Output L161 from the model T62 comprises the feed pump speed signal, steam generator level signals, steam header pressure signal for steam dump control, and steam generator pressure signal for atmospheric relief valve control that is input into the previously mentioned BOPCTL model T49. The model T49 in turn has an output L162 to the controller handler that includes the water feed pump speed error, the steam generator water level control error, steam dump control error, relief valve control error, heater drain tank level error, condensate pump recirculation controller error, gland steam condenser bypass control error, and the generator hydrogen temperature control error. The controller handler has an input L163 to the model T49 which comprises the controller ouput corresponding to the input L162. L164 is the valves admittances for the miscellaneous steam plant control valve from the valve handler.

The steam plant instrument channel model T62 previously mentioned includes the input L165 that comprises all steam plants variables having instrument outputs. As previously mentioned, the redundant measurements are not included. The redundant instruments outputs are generated within the model T62 from signal variables received from the steam plant dynamic programs. The model T62 also has an output L166 which comprises all instrument both meter and recorder outputs to the balance of plant panels. These outputs are scaled.

The plants electrical system model T57 has an output L167 to the pump handler which provides the bus energize status for all electrical busses supplying pumps; and an input L168 from the pump handler which comprises all pump motor load current. The output L169 from the model T57 to the valve handler comprises the bus energize status for all electrical busses supplying motor operated valves.

The model T57 has an input L170 from the circuit breaker status referred to as T63 in the B machine which comprises the circuit breaker open-close status for all plant bus circuit breakers. The model T57 has an output L171 which comprises the diesel-electric megawatt and megavar load to the input of the diesel generator and diesel electric bus system (ELCRNT) model T64.

The diesel generators model T64 simulates three modes of diesel generator operation; that is, not tied to the load, tied to the load, and sharing the load with the main network. The modes of diesel generator operation depend on the breaker position. The model T64 has an output L172 which comprises the diesel generator operating status; that is, running or stopped, thus the voltage available or not for each of the three generators for input to the model T57. Also, the model T64 has an output L173 which comprises the frequency for each generator for the synchroscope drive model T58.

The synchroscope interface model T58 has an ouput L174 to the panels which comprises four synchroscope frequencies. The frequency is scaled and supplied as an analog output voltage. The voltage is applied to a voltage control frequency generator whose output amplified to drive the synchroscopes. Contact outputs are set up according to synchroscope status; that is, synchroscope "connected" or "disconnected" and bus breaker open or close. On the diesel panel, contacts also select which of the three synchroscopes is active.

The model T46 has an output L176 to the gland steam model T47 which comprises turbine speed and the turning gear oil pump status. The model T46 also has an output to the model T49 comprising heater drain tank level (L177); and an input L178 from the model T49 which comprises the heater drain tank level control signal.

STEAM GENERATORS

Figure 102:
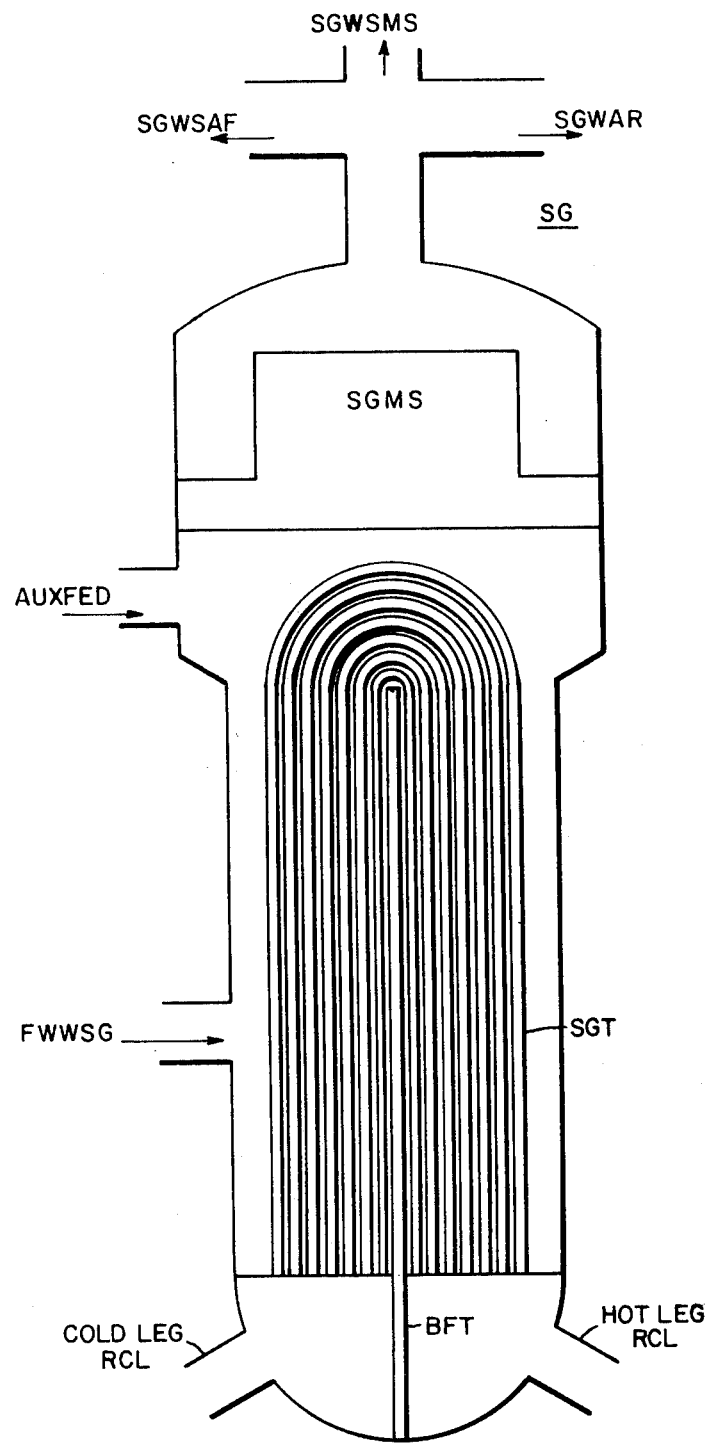
FIG. 102 is a schematic diagram of a U-tube steam generator of the type being simulated.

Referring to FIG. 102, a U-tube steam generator SG is mounted in each loop of the reactor coolant system RCS to produce steam for turbine operation. Each generator comprises two integral sections: an evaporator section, and a steam drum section. The evaporator section comprises a U-tube heat exchanger SGT for transferring heat from the reactor coolant to the secondary fluid, while the steam drum section includes moisture separating equipment SGMS.

In the steam generator for which the preferred simulator embodiment is implemented, high temperature reactor coolant flows into the opening from the hog leg of the reactor coolant loop RCL through the tubes SGT on one side of the baffle BFT and out of the tubes SGT on the opposite side of the baffle through the opening into the cold leg of the loop RCL. Feedwater enters the generator SG through FWWSG on the cold leg side of the U-tubes SGT and flows counter current to the reactor coolant flow. Reactor coolant flow. Feedwater flows directly into the preheater section and is heated almost to saturation temperature before entering the boiler section near the top of the preheater SGMS. Subsequently, a water and steam mixture flows upward through the tube bundle, and into the steam drop section. The preheater moisture separators SGMS recirculate flow through the annulus formed by the shell of the generator SG and the tube bundle wrapper on the hot leg side of the baffle BFT. An emergency feedwater inlet AUXFED is provided at the top of the tube bundle for feedwater addition in the event of a failure of the main feedwater pump.

Steam having a moisture content of approximately one quarter of 1% leaves the top portion SGWSMS of the steam generator to provide the fluid for turbine operations.

Steam Generator Simulation STMGEN

The steam generator model T24 (STMGEN) is capable of simulating plant operations that preferably include fill up and heat up of the generators SG, including the effect of air in the generators; the normal and malfunction operation of the generators SG; and the loss of reactor collant system flow through any or all of the generators.

The various inputs to the steam generator simulation STMGEN include the steam generator U-tube average temperature SGTAV(1) to SGTAV(4) which are calculated in the subroutine RCSLOP; steam flows to the main steam system SGWSMS(1) to SGWSMS(4) which are calculated in subroutine STMGEN; atmospheric and safety valve steam flows SGWAR(1) to SGWAR(4), and SGSAF(1) to SGWSAF(4) which are calculated in the subroutine BOPCTL; main feed-water flows FWWSG(1) to FWWSG(4) to the steam generators which are calculated in subroutine FWFLUD; and auxiliary feedwater flows FAWSG(1) to FAWSG(4) to the steam generators whch are calculated in subroutine AUXFED.

The outputs of the model STMGEN include a heat flux SGQ(1) to SGQ(4) to the steam generators from the primary loops of the system RCS; the total steam pressures SGPS(1) to SGPS(4) of the steam generators; steam generator water temperatures SGTS(1) to SGTS(4); and steam generator water levels SGLWR(1) SGLWR(4) for the respective steam generators.

Referring to the control console of FIGS. 93A through 93D according the present invention, each of the four steam generators SGA through SGD are modeled separately, independent of the others. Each model comprises a single lump of water that takes heat from the reactor coolant system RCS. The lump of water supplies steam to the main steam system model, the simulation of which is included in the same routine STMGEN as the present steam generators; and the lump of water receives feedwater from the feedwater system model FWFLUD. The steam that enters the main stream system from the steam generator SG through the top generator portion SGWSMS is assumed to have a quality of 100% and the enthalpy is assumed at 1200 BTU/LB.

The temperature of the water SGTS, is calculated from an instantaneous energy balance and the steam generator pressure SGPS is a function of the water temperature. Pressure is assumed to follow the saturation line, and any compressive effects are ignored.

The primary system heat transfer SGUA is assumed to be proportional to the difference in the primary coolant average temperature SGTAV and the associated generator water temperature SGTS. The constant of proportionality is the heat transfer characteristic, which is dependent on the instantaneous heat load.

The steam generator level SGLWR involves both the volume of water SGVM in the generator and the amount of steam flow SGWSMS that the generator is providing. The steam flow has an effect on the bubbles which are generated by the boiling process. As the steam flow increases, the generator level SGLWR swells due to an increase in bubbles; when the steam flow decreases, the level shrinks due to a decrease in the amount of bubbles. The shrink-swell phenomenon is assumed to be proportional to steam flow SGWSMS above 7% of the rated flow. Below 7% of the rated flow, the steam flow SGWSMS is assumed to come primarily from the flashing of water into steam. This flashing phenomenon does not depend on steam bubble formation.

A water mass balance is maintained for each of the generators. Added to the water mass is the main feedwater flow FWWSG and the auxiliary feedwater flow. Subtracted from the water mass are the main steam system flow SGWSMS, atmospheric relief valve steam flow SGWAR, safey valve steam flow SGWSAF, blowdown water flow, auxiliary feed pump steam flow for loops A and C only, and leakage flows SGWM92 due to malfunction M92.

An instantaneous energy balance is written for the water in each generator. By considering all the energy that is added to, and removed from, the water, the rate of change of the water energy becomes known. Since the energy of the system is related to the temperature of the water, the rate of change of water temperature is the result of the following equation:

$$Q + \sum \dot{m}h = (M\dot{h})$$

where:

(°) = denotes the operator d/dt, $Q$ = the flux SGQ transferred to and from the system (heat transferred in has a positive sign), $\Sigma \dot{m}h$ = the summation of mass flows and their respective enthalpies in and out of the system (flows that enter the system have a positive sign); and $M\dot{h}$ = the total mass of the system and its associated enthalpy.

Referring to FIG. 102/1, the instantaneous energy balance can be written as follows:

$$Q + \Sigma \dot{m}h = \dot{M}_{w} h_{w} + M_{w} \dot{h}_{w} + \dot{M}_{m} h_{m} + M_{m} \dot{h}_{m}$$

or $$Q + \Sigma \dot{m}h - \dot{M}_{w} h_{w} = M_{w} \dot{h}_{w} + M_{m} \dot{h}_{m}$$

or $$Q + [\dot{M}_{FW} h_{FW} + \dot{M}_{AF} h_{AF} - \dot{M}_{BD} h_{w} - \dot{M}_{s} h_{s} - \dot{M}_{LS} \times h_{s} - \dot{M}_{LK} (1-x) h_{s}] - [\dot{M}_{FW} + \dot{M}_{AF} - \dot{M}_{s} - \dot{M}_{LK} - \dot{M}_{BD}]h_{w} = M_{w}\dot{h}_{w} + M_{m}\dot{h}_{m}$$

Simplifying the equation:

$$Q + \dot{M}_{FW}(h_{FW} - h_{w}) + \dot{M}_{AF}(h_{AF} - h_{w}) - \dot{M}_{s}(h_{s} h_{w}) - \dot{M}_{LK}(X)(h_{s} - h_{w}) = M_{w} \dot{h}_{w} + M_{m} \dot{h}_{m}$$

where:

$\dot{M}_{FW}$ = the mass flow FWWSG from the Main Feedwater System, $h_{FW}$ = the enthalphy SGHFW of the water from the Main Feedwater system, $\dot{M}_{AF}$ = the mass flow FAWSG from the Auxiliary Feedwater System, $h_{AF}$ = the enthalpy of the water from the Auxiliary Feedwater system (assumed constant at 33.05 Btu/lb), $M_s$ = the total steam flow SGWMS out of the generator $h_m$ = the enthalpy SGKMTL of the metal, $h_s$ = the enthalpy of the exit. Steam (assumed constant at 1200 Btu/lb), $M_w$ = the mass of water SGMW in the generator, $M_m$ = the mass of metal that is influenced by the generator's water temperature, $h_w$ = the enthalpy of the water SGHF in the generator, $\dot{M}_{BD}$ = the mass flow rate to the blowdown system, $\dot{M}_{LK}$ = the mass flow rate SGWM92 of the feedring break malfunction, and $x$ = the quality of the leakage flow SGXLEK that results from a feedring break malfunction $(0.0 \le x \le 1.0)$.

Using the relation between enthalpy and temperature, the following expression is written:

$h_w = C_p T_w$ where:

$C_p$ = the specific heat of a material at a constant pressure, and $$T_w = \frac{Q + \dot{M}_{FW}(h_{FW}-h_w)+\dot{M}_{AF}(h_{AF}-h_w)-(\dot{M}_s+\dot{M}_{LK}X)(h_s-h_w)}{M_w C_{p,w} + M_m C_{p,m}}$$

The expression for $T_w$ is integrated continuously to determine the temperature of the water. The water and steam are assumed to follow the saturation line at all times, therefore the temperature defines all the remaining properties of the water and steam. Particularly, the steam generator pressure SGPS and the specific volume of the steam generator water SGSW are spline functions of temperature.

The main feedwater system enthalpy FWHSG(1) to FWHSG($) includes a transport delay. The transport delay is used to stimulate the 400 feet of piping between the final stage of feedwater heaters and the steam generator inlets. A five second time constant at rated feed flow is utilized to simulate this piping delay time. At flows lower than rated flow, the time constant in increased by calculating the dwell time for a plug of fluid.

When the malfunction leakage flow SGWM92 is pure water, the quality of the leak SGXLEK is zero. Such a situation exists when a feedring break malfunction is active and the water level is above the level of the feedring. As the water level drops below the feedring, the leakage quality increases to a maximum of one.

The denominator that appears in the energy balance comprises two components, one for the water mass and one for the metal mass. The specific heat of the water is assumed to be a constant at:

$$1.02 \frac{Btu}{lb} - °F$$

The metal mass is assumed constant at 330,000 pounds and the specific heat of metal is assumed constant at 0.1 Btu/lb-F.

The heat transfer between the primary system, that is the reactor coolant system RCS, and the steam generators SG(A) through SG(D) is assumed proportional to the difference between the steam generator U-tube average metal temperature SGTAV and the steam generator water temperature SGTS. A log-mean temperature difference is not used. The total heat transfer coefficient is known to vary with the plant's heat load, and it is fitted as a function of the generator heat flux for each generator. The required heat transfer coefficients are determined from the temperature difference between the steam generator water temperature and the average primary coolant temperature at forty, sixty, eighty, and one hundred percent of the rated heat load.

In the RCS system simulation, an average temperature of the primary loop is produced that depends on plant output. By knowing this function, the primary average coolant temperature is known for the forty, sixty, eighty, and one hundred percent load levels.

The steam generator fluid temperatures at the above power levels are obtained as follows. The main steam header pressure and steam flows are known for the various load levels. Also the steam generator pressure is known at 100% load level to be 720 PSIA. Since there is a pressure drop of 30 psi at 100% load level between the main steam header and the steam generator, a proportionate pressure drop can be assumed for the aforementioned lower load levels. For example, at 40% load level there is a pressure drop of 12 psi. Utilizing the known main steam header pressure and pressure drops, the steam generator pressures are known. Using the steam tables, the steam temperatures are known. By solving the equation:

$$UA = \frac{Q}{\Delta T}$$

the coordinates (UA) heat transfer coefficient and (Q) heat flow are determined for the function fit. The following temperatures are used for the determination of the total heat transfer coefficient UA:

| Percent of Rated Load | Steam Gen Press | Steam Gen Temp | Primary Avg. Temp |
|---|---|---|---|
| 40% | 862.62 | 526.98 | 551.96 |
| 60% | 818.96 | 520.93 | 554.44 |
| 80% | 773.5 | 514.37 | 556.92 |
| 100% | 720.0 | 506.25 | 559.4 |

A third order polynomial is calculated for the resulting heat transfer coefficients UA and their respective heats. Since a third order equation is used, the four data points above are fitted exactly.

It is possible that air can be introduced into the system, such as during plant shutdown. Therefore, the air pressure $SGP_{AIR}$ is added to the steam pressure SGPSTM to obtain the total air and steam pressure in the generator. Previously, the calculation for steam pressure as a function of steam temperature has been described. By assuming the air temperature to be identical to the steam or water temperature, the following equation determines the air pressure:

$$SGP_{AIR} = \frac{M_{AIR} R_{AIR} T_w + 459.63}{144 V}$$

With respect to the shrink-swell phenomenon previously described, the mass of water and the mass of steam that make up the apparent generator water level for several different load levels is obtained by predetermined data. A tabulation of this data is as follows:

SHRINK SWELL DATA FOR WATER AT 42.166 FEET (NORMAL LEVEL)

| Power | Water Mass (lb) | Displaced Mass (lb) | Sp. Volume (FT³/LB) | Displaced Volume (cu.ft.) | Displaced Vol/Mass (cu.ft.) | Pressure (psia) |
|---|---|---|---|---|---|---|
| 0%   | $16.56 \times 10^4$ | 0.0                | —       | 0.0                    | 0.0                     |       |
| 10%  | $14.27 \times 10^4$ | $2,290 \times 10^4$ | .021496 | $.0492258 \times 10^4$ | $3.4496 \times 10^{-3}$ | 973.6 |
| 30%  | $12.82 \times 10^4$ | $3.74 \times 10^4$  | .02125  | $.079475 \times 10^4$  | $6.1999 \times 10^{-3}$ | 904.9 |
| 50%  | $11.51 \times 10^4$ | $5.05 \times 10^4$  | .021038 | $.1062419 \times 10^4$ | $9.2303 \times 10^{-3}$ | 847.4 |
| 60%  | $11.42 \times 10^4$ | $5.14 \times 10^4$  | .02094  | $.1076316 \times 10^4$ | $9.42483 \times 10^{-3}$ | 819.2 |
| 75%  | $10.82 \times 10^4$ | $5.74 \times 10^4$  | .02080  | $.119392 \times 10^4$  | $11.0344 \times 10^{-3}$ | 780.4 |
| 85%  | $10.39 \times 10^4$ | $6.17 \times 10^4$  | .020711 | $.127787 \times 10^4$  | $12.29904 \times 10^{-3}$ | 756.6 |
| 100% | $9.96 \times 10^4$  | $6.60 \times 10^4$  | .02058  | $.135828 \times 10^4$  | $13.6373 \times 10^{-3}$ | 721.3 |

The water masses at several load levels as shown above are substantially smaller than the water mass at 0% load. Therefore, the difference between the water masses in the above table and the water mass at 0% load with no boiling is used to determine the volume of steam that exist in the water steam mixture.

Referring to FIG. 102/2, a plot of the steam volume divided by the mass of water in the generators versus percent of steam flow or percentage of load is illustrated, and the shrink-swell characteristic represents a straight line drawn through the maximum number of points in FIG. 102/2.

In this simulation, the flashing at low steam flow is considered. The dashline in FIG. 102/2 represents a modification to the shrink-swell straight line. Up to 7% power, the shrink-swell phenomenon will follow the parabolic dashline in FIG. 102/2. Where V is the volume occupied by the steam, S is the normalized steam flow and $M_w$ is the mass of water in the genrators, the shrink-swell response is generated as follows:

$$V = (3.62325 \times 10^{-1}S^2 - 1.086975 \times 10^{-2}S) M_w;$$
$$0 \leq S \leq .07$$

and $$V = (14.493 \times 10^{-3} S) M_w, 0.07 \leq S \leq 1.0$$

The time lag which occurs in the generation of steam bubbles is simulated. This time delay has a direct effect on the shrink-swell response. To simulate this time delay, a filter with a five second time delay is added to the displaced volume calculation.

The displaced volume of water, due to steam, and the volume of water in the generator are then added to find the total volume of water and steam SGVW.

The water level in feet in the steam generators is determined from the volume of fluid that is present in accordance with data corresponding to the preferred embodiment of the invention.

Referring to FIG. 102/3, the coordinates of level and feet are plotted, and four straight lines A through D are used to implement the data.

It should be noted that the feedring break malfunction M92 requires an admittance for the leak. Assuming a steam flow of 2080 pounds per second per square foot of feedring holes at 1000 psi, an admittance of $$5.51 \times 10^{-3} \frac{\text{lb/hr}/10^6}{\text{psi}} \text{ is used.}$$

steam generator blowdown valves are estimated to have a capacity of 100 gallons per minute with a 1000 psi pressure drop. The atmospheric relief valves and safety valves also have a predetermined capacity; and the safety valves are simulated by constructing a sum of safety valve flows for each steam generator.

MAIN STEAM SYSTEM

Figure 103:
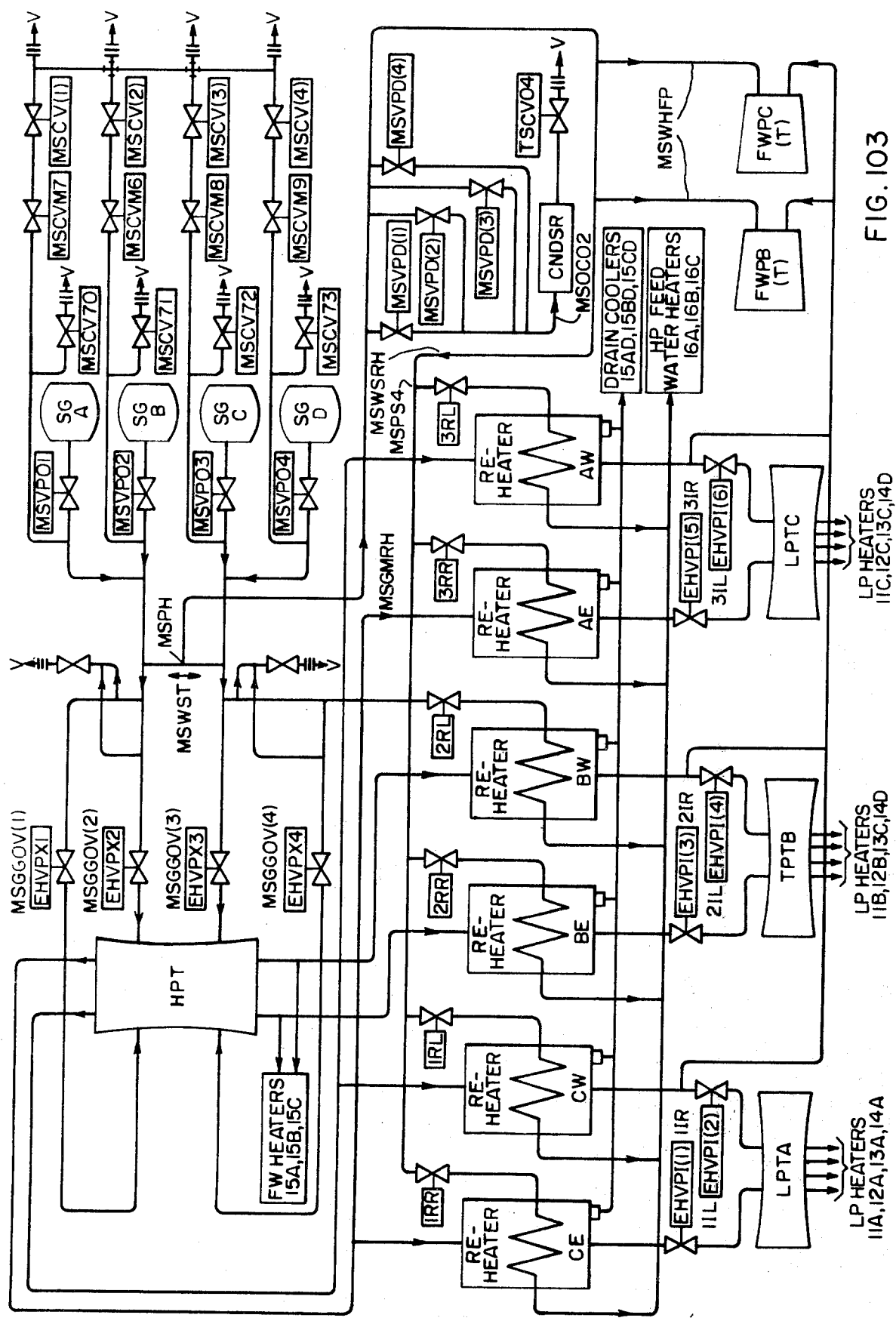
FIG. 103 is a schematic diagram of the main steam system of the type being simulated.

Referring to FIG. 103, and that portion of the control panel illustrated in FIGS. 93A, 93C, 93F, 93H, 93I and 93J, the main steam system conveys motive high pressure steam to the high and low pressure turbines from the steam generators SG(A) through SG(D); where it has been energized by the reactor coolant and through the main steam isolation or throttle valves MSVPO1 through MSVPO4, the turbine governor control valves MSGGOV(1) through MSGGOV(4); and then from the high pressure turbine; through the six reheater and moisture separators CE and CW, BE and BW, and AE and AW, and the intercept valves EHUPI(1-6) to the low pressure turbine stages LPTA, LPTB and LPTC. The hot live steam for the reheaters flows from the main steam header MSPH to the tube side of each of the aforementioned reheaters as shown in FIG. 103. The main steam is also directed to the feedwater pump turbines FWPB and FWPC from the reheaters AW, BW, and CW and from the header MSPH.

Main Steam System Simulation

The main steam system simulation is also included in the model T24 or subroutine STMGEN. The main steam network is illustrated as an analogous electrical network in FIG. 103/1. In the present case, the main steam network does not include the atmospheric and safety valve flows from the steam generators, SGA-SGD or the steam flow to the auxiliary feed pumps, which flows are included in other models. The network admittances are preferably assumed to be completely linear with the exception of the steam dump valve admittance MSGDMP and the turbine governor control valve admittance MSGHFP which use a linearized approximation of the square-law-flow equation. The linear equations are solved without any iterations. The high pressure turbine HPT is an integral part of the main steam network; and therefore will be described in connection therewith. In so simulating the turbine HPT a T network comprising fixed admittances is provided. Any check valves in the system are shown as diodes in the network diagram.

In the present embodiment, the main steam network is capable of simulating the following plant; isolation of any or all steam generators SGA through SGD due to the action of isolation valve MSVPO1 through MSVPO4; steam dump to the condenser CNDSR; steam flow to the reheaters, including the effect of the reheater control station; steam flow to the feedwater pumps; steam flow to the high pressure turbine modulated by governor control valve MSGGOV(1) calculated MSGGOV(4); and extraction flow to the feedwater heaters, including the effect of both the shutoff and check valves.

The main steam network preferably receives as inputs the pressures and admittances from several models and calculates the proper flows and pressures. The inputs include steam generator steam pressures SGPS(1) to SGPS(4) from the subroutine STMGEN; isolation valve positions MSPVO1 to MSPVO4 from the "A" machine, feedwater heater pressures FWPH2 and FWPH3 for stages 2 and 3 from the subroutine RHMSEP; reheater pressure REPS from the subroutine RHMSEP; and the governor valve admittances MSGGOV, which are calculated from the governor valve positions.

The outputs of the model preferably include steam flows SGWSM(1)–(4) from the steam generators SGA through SGD to the main steam system, the main steam header pressure MSPH; as an indicator of turbine load, the high pressure turbine HPT impulse pressure HPW1 and normalized impulse pressure HPWIN; high pressure turbine extraction and exhaust flows HPW2 and HPW3; and the reheater live steam flow MSWSRH. The turbine speed calculation is considered in connection with the model T46.

Referring particularly to FIGS. 103 and 103/1, the main steam line admittances MSGO1 to MSGO4 are chosen to yield a 30 psid pressure drop when the steam flow is $3.5 \times 10^6$ lb/hr. The 30 psid pressure drop is used in lieu of data that defines the steam generator pressure to be 720 psia and the main steam header pressure to be 690 psia at 100% plant load. Each admittance is assumed linear with the corresponding main steam isolation valve position MSVPO1 to MSVPO4. The admittances MSGO1 to MSGO4 also act as check valves. When reverse flow is detected, the proper admittance is set to zero.

In contrast, the feed pump admittance calculation is obtained by first calculating the required steam flow from the main steam header to the turbine driven feed pumps FWPB and FWPC by the feed pump efficiency program hereinafter described. The feed pump admittance MSGHFP is then calculated from the necessary flow and the existing header pressure. In this calculation the flow is known while the admittance is unknown.

In the preferred embodiment of the power plant simulated there are twelve steam dump valves MSGDMP that operate to dump the steam directly from the steam generators to the condenser CNDSR under certain circumstances. In the simulation, the steam dump valves are modeled as four groups of three valves MSVPD(1)–(4). The first group MSVP (1) is designated as cool down valves, which are identical, and lack individual malfunction requirements. Thus, the four equivalent valves MSVPD(1)–(4) are simulated with each equivalent valve having a coefficient of three times the actual coefficient of the valve. Choked flow is calculated utilizing the following equation:

$$W = KV_v \sqrt{\frac{P_h/2}{v}}$$

where:
K is a constant of 63.52, $C_v$ is the valve coefficient, $v$ is the constant specific volume of 1.2 cu. ft.$^3$/lb,
$P_h$ is the main steam header pressure in psia, and W is flow in lb/hr.

Since the linear equations need a linear admittance, the flow W divided by the main steam header pressure minus the condenser pressure $P_c$ will give the desired admittance G. Since a choked-flow relation is used in the admittance calculation, the admittance simulates the choked-flow condition. Therefore, G equals $W/(P_h - P_c)$.

The turbine governor valves MSGGOV(1) through MSGGOV(4) are simulated in the same manner with consideration being given to choked-flow and square-law-type flow equations. The governor valve positions are simulated by analog circuitry independent of the computer and received by the model as analog inputs to the computer system. Identical flow coefficients $C_v$ are used for the first three governor valves, while the fourth valve MSGGOV(4) uses another value. Once a total admittance is calculated, it is averaged with two past total admittances to obtain smooth steady state response.

The reheater hot steam admittance must vary with plant load. The required relation between the reheater admittance and plant load level is plotted in FIG. 103/2 to which reference is made. The admittances in this FIG. 103/2 are obtained from the main steam header pressure MSPH, the pressure FWPH3 in the stage three feed heaters, and the mass flow at several power levels. A minimum value of $0.440 \times 10^{-3}$ lb/hr/$10^6$/(psi) is assumed. Two line segments are used to represent the admittance MSGSRH for load levels from twenty to one hundred percent as indicated by the normalized impulse pressure HPWIN as follows:

MSGSRH = $2.27771 \times 10^{-3}$ HPWIN 0.20
$\leq$ HPWIN $\leq$ 0.80 and

MSGSRH = $1.6325 \times 10^{-3} + 4.3184 \times 10^{-3}$ HPWIN 70.80

MSGSPH has an upper limit of $3.0 \times 10^{-3}$ (lb/hr/$10^6$)/(psi).

The reheater also has flow control valves that are used to vary the hot steam flow. To simulate these valves, the output of the reheater control station is normalized to the range 0 to 1 and multiplied with the reheater admittance. The resulting product forms the admittance that is used to calculate the main steam flow to the reheater MSGMRH.

The high pressure turbine HPT inlet and exhaust admittances HPG1 and HPG3 are fixed values. These values produce an accurate approximation of the extraction and exhaust pressures for which the turbine is designed. For the inlet admittance HPG1, a value is selected by considering the actual design data at the maximum calculated power level. For example, the main steam header pressure MSPH may be 690 psia, and the high pressure turbine extraction pressure HPPEXT may be 391 psia. For a turbine governor valve admittance MSGGOV of 1 and an impulse flow HPW1 of $13.7609 \times 10^6$ lb/hr, an admittance of $4.82437 \times 10^{-2}$ lb/hr/$10^6$ (psi) is needed. The exhaust admittance HPG3 is also calculated from the same power level. The exhaust pressure is 178 psia and the total flow is 12.5833 lb/hr/$10^6$. Thus, the admittance has a value of $5.9076694 \times 10^{-2}$ lb/hr/$10^6$ (psi).

The high pressure turbine extraction admittance HPG2 is also a fixed value, but it is multiplied by the feedwater heater group 3 extraction steam valve coefficient FWCV31. Since the extraction steam valves flow coefficient FWCV31 ranges from zero to one, the turbine extraction admittance HPG2 is reduced from its full value to zero as the extraction valve FWCV31 is closed. The extraction admittance HPG2 (see FIGS. 103/3 and 103/4) varies with load as the design data indicates. A constant maximum admittance of $6.666 \times 10^{-2}$ lb/hr/$10^6$/(psi) is selected, for example. This value corresponds to a flow of 1 lb/hr/$10^6$ with a differential pressure of 15 psi.

is converted into $\Delta$ network, as shown in FIGS. 103/3 and 103/4. The equations are now written in the following matrix notation given using symbols as follows:

```
MSZG(1) = MSG01
MSZG(2) = MSG02
MSZG(3) = MSG03.
MSZG(4) = MSG04
MSZG(5) = MSGSRH * REZAMS
MSZG(6) = FPWST/MSPH1
MSZG(7) = MSGRHA + MSGRHB
MSZG(8) = HPG2
MSZG(9) = MSGDMP
MSZG(10)= (MSGG0V * HPG1)/(MSGG0V + HPG1)
```

MATRIX EQUATION FOR MAIN STEAM NETWORK $$\begin{bmatrix} 1 & -1 & -1 & -1 & -1 & 1 & 1 & 1 & 0 & 0 & 0 & 0 \\ 0 & 1 & 0 & 0 & 0 & 0 & 0 & 0 & 0 & 0 & 0 & MSG(1) \\ 0 & 0 & 1 & 0 & 0 & 0 & 0 & 0 & 0 & 0 & 0 & MSG(2) \\ 0 & 0 & 0 & 1 & 0 & 0 & 0 & 0 & 0 & 0 & 0 & MSG(3) \\ 0 & 0 & 0 & 0 & 1 & 0 & 0 & 0 & 0 & 0 & 0 & MSG(4) \\ 0 & 0 & 0 & 0 & 0 & 1 & 0 & 0 & 0 & 0 & 0 & -MSG(6) \\ 0 & 0 & 0 & 0 & 0 & 0 & 1 & 0 & 0 & 0 & 0 & -MSG(5) \\ 0 & 0 & 0 & 0 & 0 & 0 & 0 & 1 & 0 & 0 & 0 & -MSG(9) \\ 0 & 0 & 0 & 0 & 0 & 0 & 0 & 0 & 1 & 0 & -MSG(8) & 0 \\ -1 & 0 & 0 & 0 & 0 & 0 & 0 & 0 & 1 & 1 & 0 & 0 \\ 0 & 0 & 0 & 0 & 0 & 0 & 0 & 0 & 0 & -1 & MSG(7) & 0 \\ -1 & 0 & 0 & 0 & 0 & 0 & 0 & 0 & 0 & 0 & -MSG(10) & MSG(10) \end{bmatrix} * \begin{bmatrix} MSZX(1) \\ MSZX(2) \\ MSZX(3) \\ MSZX(4) \\ MSZX(5) \\ MSZX(6) \\ MSZX(7) \\ MSZX(8) \\ MSZX(9) \\ MSZX(10) \\ MSZX(11) \\ MSZX(12) \end{bmatrix} = \begin{bmatrix} 0 \\ MSZB(2) \\ MSZB(3) \\ MSZB(4) \\ MSZB(5) \\ MSZB(6) \\ MSZB(7) \\ MSZB(8) \\ MSZB(9) \\ 0 \\ MSZB(10) \\ 0 \end{bmatrix}$$

The extraction admittance HPG3 between the high pressure turbine exhaust and the feedwater heater Group 2 is a constant. This admittance is multiplied by the feedwater heater Group 3 extraction valve coefficient, in a manner identical to the high pressure turbine extraction admittance HPG2 described above. This admittance HPG2 is based on an assumed pressure drop of 3 psid at a flow of $2.903 \times 10^1$ lb/hr/$10^6$, for example, which condition occurs at a power level of 40%.

The admittance between the high pressure turbine exhaust and the inlet to the reheater moisture separators REG6 is a constant value. This value has been selected to yield a pressure drop of 2.9 psid at a flow of $4.57228 \times 10^6$ lb/hr, for example.

Solution of the Main Steam Network Equations

Referring to FIG. 103/1, the solution of the main steam network equations is obtained by the subroutine SOLVE. Such equations are based on the electrical analogy; therefore, they follow Ohm's and Kirchhoff's Laws; as follows:

```
SGWSMS(1) = MSGO1 * [SGPS(1) - MSPH]
SGWSMS(2) = MSGO2 * [SGPS(2) - MSPH]
SGWSMS(3) = MSGO3 * [SGPS(3) - MSPH]
SGWSMS(4) = MSGO4 * [SGPS(4) - MSPH]
MSWDMP    = MSGDMP* [MSPH - CDP]
FPWST     = MSGHFP* [MSPH - CDP]
MSWSRH    = REZAMS* MSGSRH * [MSPH - FWPH3]
HPW2      = HPG2   * [HPPEXT - FWPH3]
```

```
MSZB(1) = MSGRHA      * FWPH2 + MSGRHB * REPS
MSZB(2) = MSZG(1)     * SGPS(1)
MSZB(3) = MSZG(2)     * SGPS(2)
MSZB(4) = MSZG(3)     * SGPS(3)
MSZB(5) = MSZG(4)     * SGPS(4)
MSZB(6) = -MSZG(6)    * CDP
MSZB(7) = -MSZG(5)    * FWPH3
MSZB(8) = -MSZG(9)    * CDP
MSZB(9) = -MSZG(8)    * FWPH3
```

The vector X is defined as:

```
MSZX(1)  = HPW1
MSZX(2)  = SGWSMS(1)
MSZX(3)  = SGWSMS(2)
MSZX(4)  = SGWSMS(3)
MSZX(5)  = SGWSMS(4)
MSZX(6)  = MSWHFP
MSZX(7)  = MSWSRH
MSZX(8)  = MSWDMP
MSZX(9)  = HPW2
MSZX(10) = HPW3
MSZX(11) = HPPEXT
MSZX(12) = MSPH
```

The matrix is sparse permitting explicit solution. By means of the Gaussian elimination technique, five off-diagonal elements in the matrix are eliminated, yielding the upper triangular matrix of the form given as follows:

$$\begin{bmatrix} 1 & -1 & -1 & -1 & -1 & 1 & 1 & 1 & & & & \\ & 1 & & & & & & & & & & \\ & & 1 & & & & & & & & & \\ & & & 1 & & & & & & & & \\ & & & & 1 & & & & & & & \\ & & & & & A(1) & & & & & & \\ & & & & & A(2) & & & & & & \\ & & & & & A(3) & & & & & & \\ & & & & & A(4) & & & & & & \\ & & & & & -A(6)[*] & & & & & & \\ & & & & & -A(5) & & & & & & \\ & & & & & -A(9) & & & & & & \\ & & & & & & & & & & & \\ & & & & & & & -A(8) & & & & \\ & & & 1 & & & A(8) & A10 & & & & \\ & & & & 1 & & ADIG11 & A10 & & & & \\ & & & & & & & ADIG12 & & & & \end{bmatrix} \begin{bmatrix} X(1) \\ X(2) \\ X(3) \\ X(4) \\ X(5) \\ X(6) \\ X(7) \\ X(8) \\ X(9) \\ X(10) \\ X(11) \\ X(12) \end{bmatrix} = \begin{bmatrix} 0 \\ B(2) \\ B(3) \\ B(4) \\ B(5) \\ B(6) \\ B(7) \\ B(8) \\ B(9) \\ B(10) \\ B(11) \\ B(12) \end{bmatrix}$$

The continuity equations used are:

HPW1 = SGWSMS(1) + SGWSMS(2) + SGWSMS(3) + SGWSMS(4) − MSWHFP − MSWSRH − MSWDMP and

HPW1 = HPW2 + HPW3

The y-network at the right-hand end of the FIG. 103/1

All entries are equal to zero except as shown. Entries A(1) through A(10) correspond to the admittances MSZG(1) through MSZG(10) defined above, while the others are defined as follows:

A10 = A(1) + A(2) + A(3) + A(4) + A(5) + A(6) + A(9)
ADIG11 = A(7) = A(8)
ADIG12 = A10 * [1. + A(10)/ADIG11] + A(10)

Also B(1) through B(9) correspond to the entries MSZB(1) through MSZB(9), and B(10) through B(12) are defined as:

$$B(10) = B(2) + B(3) + B(4) + B(5) - B(6) - B(7) - B(8) - B(9)$$
$$B(11) = B(10) + B(1)$$
$$B(12) = B(10) + B(11) * A(10)/ADIG11 + B(9)$$

By using back substitution, vector X is calculated starting through the last element, and its entries correspond to those of the vector MSZX(I). Because of the sparseness of the matrix, continuous Gaussian elimination procedure is avoided in obtaining an explicit solution.

Briefly, in summary the simulation of the main steam network uses linear equations to represent the entire network. The pressures in the individual steam generators, feedwater heaters, and condensers are inputs to the network along with all valve admittances. The main steam system network is solved simultaneously and all the flows are calculated. The end points of the network are located at other models that include an integration. For example, the steam pressure in the generator is a function of steam temperature which is an integral that depends on flow. Hence deviation in steam flow results in a gradual change in pressure which in turn causes a further change in steam flow.

The solution of the main steam system required the connection of the steam generators, reheaters, and feedwater heaters and utilizes a technique that is simple and yet dynamically stable, which is effected by the simultaneous solution of linear equations. Since the equations are linear, the admittances in the system must be linear, however, the admittances of the simulated steam dump valves and turbine control valves have large flows and impose large pressure drops on the system. For these admittances, the effects of square flow relationship and the effects of critical flow are simulated.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. Also some features are applicable to fossil-fired power plants. It is further understood, that with respect to the individual models, that the changing of one or more models in the simulator does not affect the system, method, or operation of other models in the simulator.

Reference is made to U.S. patent application bearing Ser. No. 333,901 entitled "Training Simulator For a Nuclear Power Plant" and filed by G. L. Gregg, R. E. Putman and J. W. Gomola which is assigned to the present assignee and filed concurrently herewith; and which is incorporated herein by reference and made a part hereof.

We claim:

1. An automated training simulator for the real-time dynamic operation of a power plant; comprising
   a plurality of command devices corresponding to representative fluid control actuating devices of a representative fluid distribution system;
   means responsive to the operation of the command devices to generate an input signal relating to the operation of each representative fluid control device;
   calculating means including sequence controlling means having the following components
   a. means governed by each input signal to generate a data value relating to a linear admittance for each representative fluid control device in accordance with data values relating to flow and pressure for spaced locations of the representative fluid system,
   b. means governed by data values including the generated linear admittance data values to generate data values relating to flow and pressure for each said spaced location of the representative fluid system; and
   indicating devices responsive to the generated data values relating to flow and pressure to monitor the physical values in the representative fluid system.

2. An automated training simulator according to claim 1 wherein the sequence controlling means generates said data values repetitively at fixed time intervals; and the generated data values relating to flows and pressures generated during one of said fixed time intervals are in accordance with the data values relating to linear admittance generated during the preceding fixed time interval.

3. An automated training simulator according to claim 2 wherein the calculating means is structured in a programmed digital computer means.

4. An automated training simulator according to claim 1 wherein each pressure data value is generated in accordance with a data value relating to temperature and enthalpy, each flow data value is generated in accordance with the generated pressure data value, and the calculating means includes means to generate the temperature and enthalpy data values in accordance with an instantaneous energy balance equation.

5. An automated training simulator according to claim 4 wherein each data value is generated in a programmed digital computer means.

6. An automated training simulator according to claim 1 wherein the representative fluid distribution system includes a representative pump; and the sequence controlling means further includes (a) means governed by the input signals to generate data values relating to pump flow and pump speed, (b) means to generate data values relating to pump shut-off head pressure and internal admittance in accordance with the data values relating to pump speed and pump flow.

7. An automated training simulator according to claim 6 wherein the representative fluid distribution system includes a representative steam generator; and the sequence controlling means further includes
   a. means governed by the data value relating to flow to generate a data value relating to steam generator pressure,
   b. means governed by data values relating to steam flow and water mass to generate a data value relating to the proportion of steam generator water and steam mass,
   c. means to generate a data value relating to steam generator total volume water and steam mixture in accordance with the data value relating to mass,
   d. means to generate a data value relating to steam generator water level in accordance with the data value relating to steam generator volume; and
   indicating means governed by the steam generator water level data value to monitor the water level of the representative steam generator.

8. An automated training simulator according to claim 7, further comprising circuit means operative to delay the generation of the data values relating to volume for a predetermined time interval, whereby the indicating means monitors the shrink-swell characteristics of generator steam water volume.

9. An automated training simulator according to claim 7 wherein the calculating means is structured in a programmed digital computer means.

10. An automated training simulator according to claim 6 wherein the calculating means is structured in a programmed digital computer means.

11. An automated training simulator according to claim 1 wherein the calculating means is structured in a programmed digital computer means.

12. An automated training simulator for the real-time dynamic operation of a power plant; comprising
a plurality of command devices corresponding to representative fluid control actuating devices of a representative fluid distribution system;
means responsive to the operation of each command device to generate an input signal representative of the operation of a respective representative fluid control device;
calculating means to generate data values repetitively during successive time intervals, said calculating means including sequence controlling means having the following components
 a. means to store each of the generated data values including data values relating to flow, pressure and linear admittance,
 b. means to generate during each said time interval data values relating to flow and pressure in accordance with the stored generated data value relating to linear admittance,
 c. means governed by said input signal to generate during each said time interval a data value relating to a linear admittance in accordance with data values including the stored data values relating to flow and pressure; and
indicating devices governed by the generated data values relating to flow and pressure to monitor the operation of the representative fluid system.

13. An automated training simulator according to claim 12 wherein the data value relating to admittance is generated in accordance with data values relating to a maximum flow coefficient value, a density constant and a unit conversion constant.

14. An automated training simulator according to claim 13 wherein the data value relating to temperature is generated in accordance with data values relating to saturated conditions.

15. An automated training simulator according to claim 14 wherein each data value is generated in a programmed digital computer means.

16. An automated training simulator according to claim 13 wherein each data value is generated in a programmed digital computer means.

17. An automated training simulator according to claim 12 wherein the representative fluid distribution system corresponds to a main steam system having a plurality of representative steam generators for conducting steam to a representative common header said sequence controlling means further including
 a. means to generate a data value relating to steam pressure for each representative steam generator in accordance with data values relating to enthalpy and temperature,
 b. means to generate data values relating to enthalpy and temperature for each representative steam generator in accordance with data values relating to an instantaneous energy balance, and
 c. means to generate a data value relating to flow for each representative steam generator in accordance with the data value relating to pressure.

18. An automated training simulator according to claim 17 wherein the calculating means is structured in a programmed digital computer means.

19. An automated training simulator according to claim 12 wherein the calculating means is structured in a programmed digital computer means.

* * * * *